(12) United States Patent
Todoroki

(10) Patent No.: US 10,605,906 B2
(45) Date of Patent: Mar. 31, 2020

(54) SANITARY DEVICE

(71) Applicant: TOTO LTD., Kitakyushu-shi, Fukuoka (JP)

(72) Inventor: Kentaro Todoroki, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 366 days.

(21) Appl. No.: 15/460,350

(22) Filed: Mar. 16, 2017

(65) Prior Publication Data
US 2017/0276781 A1    Sep. 28, 2017

(30) Foreign Application Priority Data

Mar. 22, 2016 (JP) ................. 2016-057656

(51) Int. Cl.
| | |
|---|---|
| *G01S 13/56* | (2006.01) |
| *G01S 13/88* | (2006.01) |
| *E03D 9/08* | (2006.01) |
| *E03D 5/10* | (2006.01) |
| *G01S 13/50* | (2006.01) |
| *G01S 7/40* | (2006.01) |
| *A47K 13/30* | (2006.01) |
| *A47K 13/10* | (2006.01) |

(52) U.S. Cl.
CPC .............. *G01S 13/56* (2013.01); *E03D 5/105* (2013.01); *E03D 9/08* (2013.01); *G01S 7/40* (2013.01); *G01S 13/505* (2013.01); *G01S 13/88* (2013.01); *A47K 13/10* (2013.01); *A47K 13/305* (2013.01)

(58) Field of Classification Search
CPC ........ G01S 13/56; G01S 13/505; G01S 13/88; G01S 7/40; E03D 5/01; E03D 5/10; E03D 5/105; E03D 5/022; A47K 13/00; A47K 13/10; A47K 13/105
See application file for complete search history.

(56) References Cited

U.S. PATENT DOCUMENTS

| 6,206,340 B1 * | 3/2001 | Paese ..................... E03C 1/057 251/129.04 |
| 2002/0157176 A1 * | 10/2002 | Wawrla ................... E03D 5/105 4/304 |
| 2004/0196177 A1 * | 10/2004 | Billington ............. G01S 7/4004 342/174 |

(Continued)

FOREIGN PATENT DOCUMENTS

| JP | 2005-290796 A | 10/2005 |
| JP | 2014-174965 A | 9/2014 |

*Primary Examiner* — Peter M Bythrow
(74) *Attorney, Agent, or Firm* — Pearne & Gordon LLP

(57) ABSTRACT

A sanitary device includes a radio wave sensor, a control section. The radio wave sensor is configured to obtain information on a sensing target by a reflection wave of an emitted radio wave. The control section is configured to control operation of an instrument based on a sensing signal including a first signal and a second signal outputted from the radio wave sensor. Difference between a phase of the second signal and a phase of the first signal is not less than 60° and not more than 120°. The control section is configured to determine presence or absence of the sensing target based on sum of square of difference between a value of the first signal and a first reference value and square of difference between a value of the second signal and a second reference value.

6 Claims, 15 Drawing Sheets

(56) References Cited

U.S. PATENT DOCUMENTS

| | | | |
|---|---|---|---|
| 2005/0114992 A1* | 6/2005 | Todoroki | E03D 3/00 4/313 |
| 2012/0154169 A1* | 6/2012 | Hoekstra | G07F 17/18 340/870.01 |
| 2015/0154849 A1* | 6/2015 | Matsui | G08B 21/22 342/28 |
| 2016/0025847 A1 | 1/2016 | Okuya | |

* cited by examiner

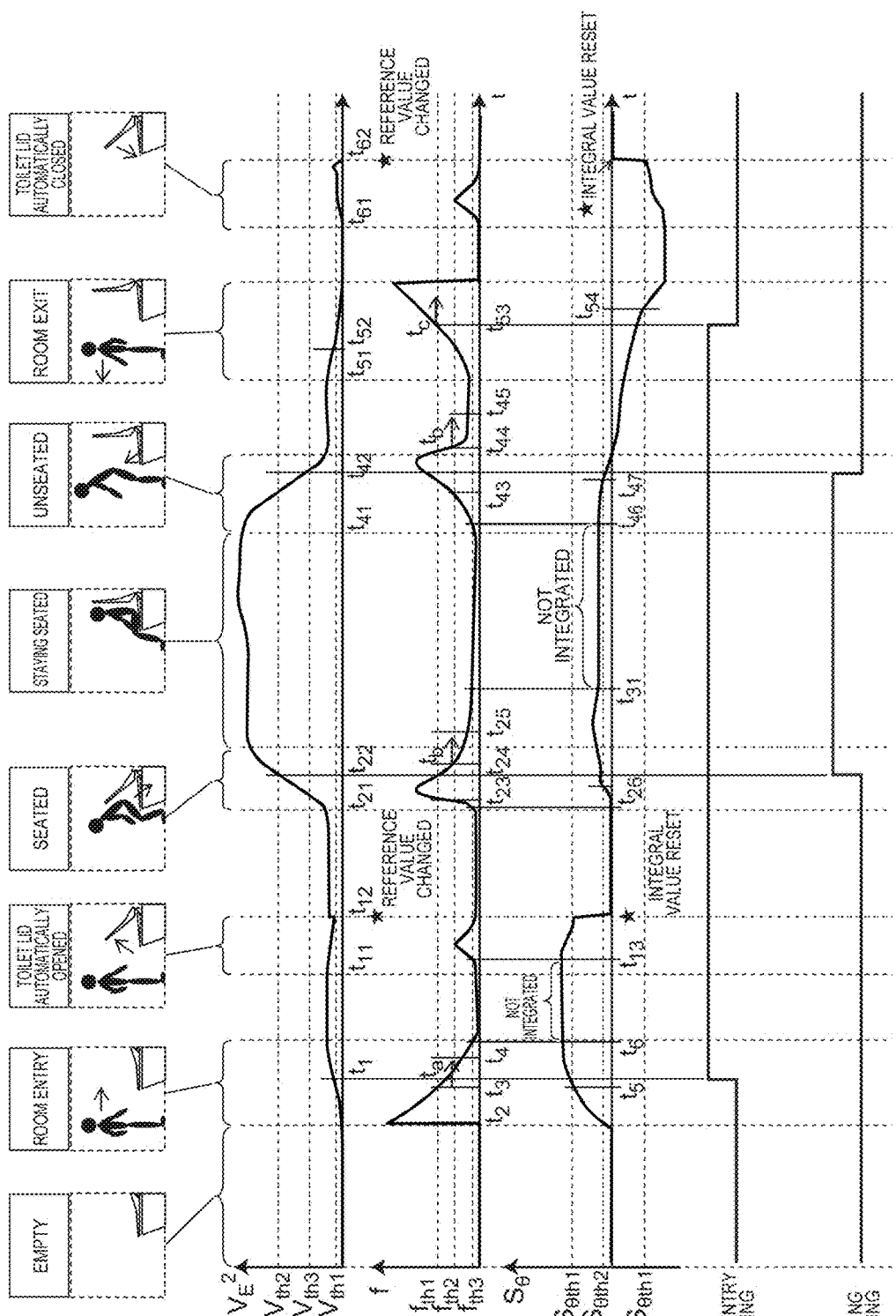

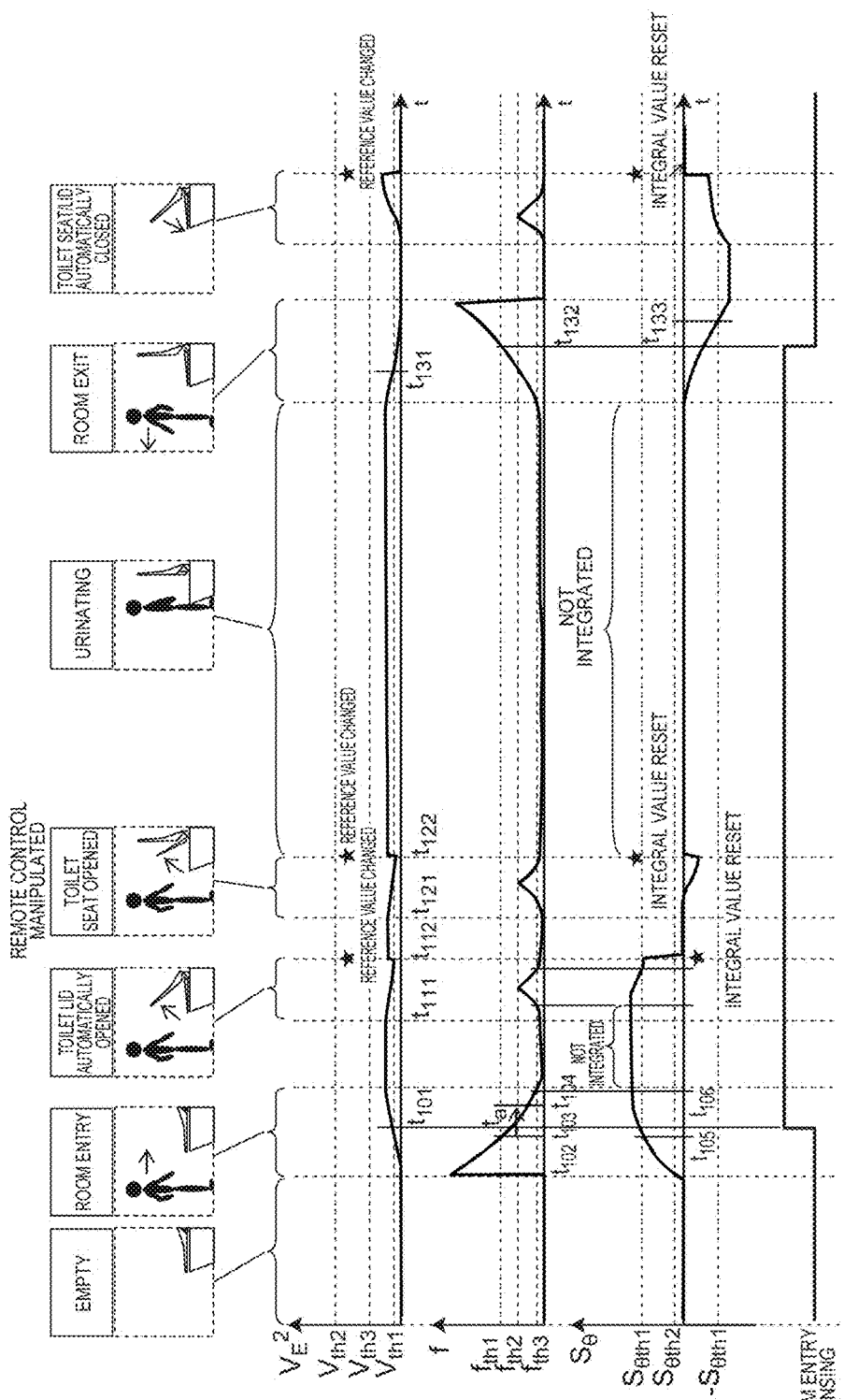

SANITARY DEVICE

CROSS-REFERENCE TO RELATED APPLICATIONS

This application is based upon and claims the benefit of priority from Japanese Patent Application No. 2016-057656, filed on Mar. 22, 2016; the entire contents of which are incorporated herein by reference.

FIELD

Embodiments of the invention relate to a sanitary device.

BACKGROUND

There is known a sanitary device operable for sensing a sensing target such as a human body and controlling instruments based on the sensing result. For instance, a toilet device is provided with a seating sensor for sensing a user seated on the toilet seat. Flushing and other functions of the toilet device are controlled based on the sensing result of the seating sensor. A commonly known example of the seating sensor is a photoelectric sensor.

However, installation of a photoelectric sensor requires providing a translucent window part in e.g. the flush tank or other location and embedding the photoelectric sensor so as to face the window part. Thus, the toilet device is defiled by the window part. Furthermore, this limits the flexibility of design of e.g. the toilet stool and other devices. There is room for improvement on these points.

To solve this problem, there is proposed a multi-functional toilet device operable for sensing a user seated on the toilet seat by a radio wave sensor such as a Doppler sensor. Radio waves transmitted by the Doppler sensor can pass through e.g. resin. Thus, for instance, the Doppler sensor can be installed in the state of being hidden inside e.g. the casing of the toilet device. This can dispense with the window part required for the photoelectric sensor. However, the Doppler sensor and the microwave sensor are sensors for sensing motion. Thus, it is difficult to determine accurately the presence or absence of a stationary sensing target such as a human body. Furthermore, it is difficult to distinguish the unseating motion of the user from fine motions of the seated user.

To solve this problem, Japanese Unexamined Patent Publication No. 2003-279643 proposes a human body sensing device using a plurality of output signals with mutually different phases. The plurality of output signals are full-wave rectified at an arbitrary reference voltage to calculate the trajectory of the maximum of each full-wave rectified signal. The distance between the sensing target and the human body sensing device can be estimated based on this maximum trajectory. This can determine the presence or absence of a stationary sensing target, and can improve the reliability of seating sensing.

However, the aforementioned maximum trajectory oscillates with the distance to the sensing target. This may cause an error in the estimated distance to the sensing target. More specifically, in the case of a toilet device, the sensitivity of seating sensing may be lowered depending on the stationary position of the user. Furthermore, the level of the output signal may change with the closing or opening motion of the toilet lid. The accuracy of seating sensing may be lowered unless the reference voltage is suitably set in response to such change in the level of the output signal.

SUMMARY

A sanitary device according to an embodiment comprises a radio wave sensor configured to obtain information on a sensing target by a reflection wave of an emitted radio wave, and a control section configured to control operation of an instrument based on a sensing signal including a first signal and a second signal outputted from the radio wave sensor. The difference between the phase of the second signal and the phase of the first signal is not less than 60° and not more than 120°. The control section is configured to determine the presence or absence of the sensing target based on the sum of the square of the difference between the value of the first signal and a first reference value and the square of the difference between the value of the second signal and a second reference value.

BRIEF DESCRIPTION OF THE DRAWINGS

FIGS. 14A to 14E are timing charts illustrating the operation of the sanitary device according to the embodiment;

FIGS. 15A to 15D are timing charts illustrating the operation of the sanitary device according to the embodiment.

DETAILED DESCRIPTION

Figure 1:
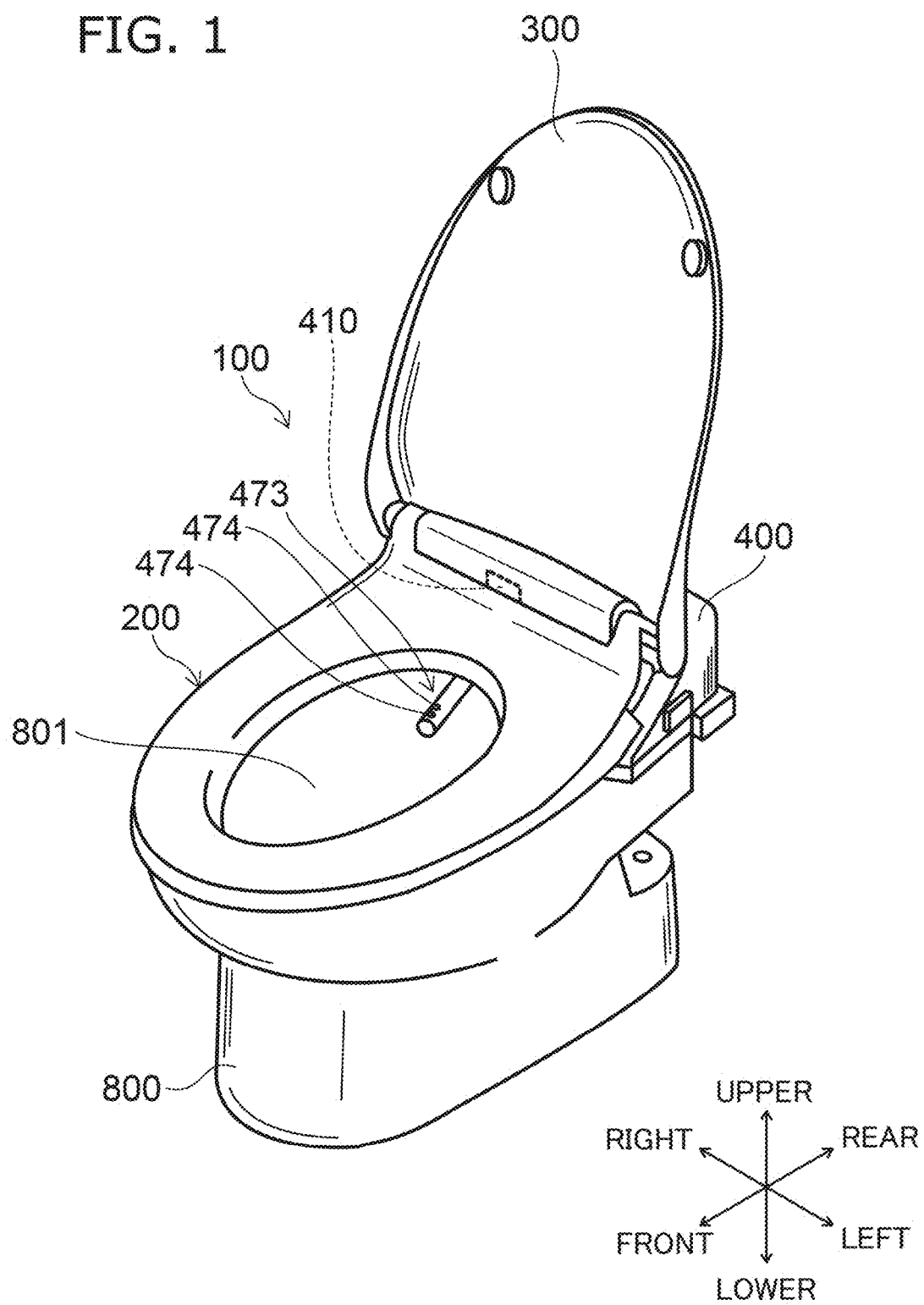
FIG. 1 is a perspective view showing a toilet device according to the present embodiment.

A first aspect of the invention is a sanitary device comprising a radio wave sensor configured to obtain information on a sensing target by a reflection wave of an emitted radio wave, and a control section configured to control operation of an instrument based on a sensing signal including a first signal and a second signal outputted from the radio wave sensor. The difference between a phase of the second signal and a phase of the first signal is not less than 60° and not more than 120°. The control section is configured to determine presence or absence of the sensing target based on sum of square of difference between a value of the first signal and a first reference value and square of difference between a value of the second signal and a second reference value.

In this sanitary device, use of the sum of squares of two signals with mutually different phases enables accurate determination of the presence or absence of the sensing target even at rest.

A second aspect of the invention is a sanitary device according to the first aspect of the invention, wherein the control section enables and disables changing of the first reference value based on the first signal, and the control section enables and disables changing of the second reference value based on the second signal.

The change of the environment around the radio wave sensor such as temperature may cause misalignment between the signal level of the first signal and the signal level of the second signal. In this sanitary device, the error caused by the misalignment between the signal levels can be suppressed by changing the first reference value and the second reference value. Thus, the sanitary device can respond to the change of the environment around the radio wave sensor. This enables accurate determination of the presence or absence of the sensing target. On the other hand, changing of the first reference value and the second reference value can be disabled when the signal levels of the first signal and the second signal are changed by the presence of the sensing target. Then, the first reference value and the second reference value are correctly set to the signal levels of the first signal and the second signal at the time of absence of the sensing target. This enables accurate determination of the presence or absence of the sensing target.

A third aspect of the invention is a sanitary device according to the first aspect of the invention, wherein the control section sets the first reference value and the second reference value to respective predetermined values for each state of the instrument.

The change of the state of the instrument upon e.g. operation of the instrument may cause misalignment between the signal level of the first signal and the signal level of the second signal. In this sanitary device, the error caused by the misalignment between the signal levels can be suppressed by setting the first reference value and the second reference value in accordance with the state of the instrument. Thus, the sanitary device can respond to the change of the state of the instrument. This enables accurate determination of the presence or absence of the sensing target.

A fourth aspect of the invention is a sanitary device according to the first or second aspect of the invention, wherein the control section changes the first reference value based on the first signal after operation of the instrument, and changes the second reference value based on the second signal after operation of the instrument.

The change of the state of the instrument upon e.g. operation of the instrument may cause misalignment between the signal level of the first signal and the signal level of the second signal. In this sanitary device, the error caused by the misalignment between the signal levels can be suppressed by changing the first reference value and the second reference value after the operation of the instrument. Thus, the sanitary device can respond to the change of the state of the instrument. This enables accurate determination of the presence or absence of the sensing target.

A fifth aspect of the invention is a sanitary device according to one of the first to fourth aspects of the invention, wherein the control section calculates frequency of the sensing signal and determines presence or absence of the sensing target when the frequency is higher than a prescribed threshold and within a prescribed time thereafter.

In this sanitary device, the presence or absence of the sensing target is determined also based on the frequency of the sensing signal. Thus, the determination can be made within a limited time such as after the motion of the sensing target. This can further improve the accuracy of the determination. Thus, erroneous sensing can be prevented.

A sixth aspect of the invention is a sanitary device according to one of the first to fifth aspects of the invention, wherein the control section calculates a movement amount indicating a distance of the sensing target having approached the radio wave sensor or a distance of the sensing target having left the radio wave sensor based on the first signal and the second signal, and uses the movement amount to determine presence or absence of the sensing target.

In this sanitary device, the presence or absence of the sensing target can be determined also based on the movement amount of the sensing target. This can further improve the accuracy of the determination. Thus, erroneous sensing can be prevented.

A seventh aspect of the invention is a sanitary device according to the fifth or sixth aspect of the invention, wherein the control section calculates a phase of the sensing signal based on the first signal and the second signal.

In this sanitary device, the phase of the sensing signal can be calculated each time the first signal and the second signal are obtained. The change of the phase of the sensing signal represents the movement amount of the sensing target. Thus, the motion of the sensing target can be grasped with high accuracy. The amount of change in the phase of the sensing signal properly reflects the motion of an object having a large amount of reflection of radio waves. Furthermore, the frequency of the sensing signal can be calculated from the change of the phase of the sensing signal per unit time. These facilitate recognizing the motion of the sensing target.

An eighth aspect of the invention is a sanitary device according to the seventh aspect of the invention, wherein the control section determines presence or absence of the sensing target based on an integral value of amount of change in the phase of the sensing signal.

In this sanitary device, the phase of the sensing signal can be calculated each time the first signal and the second signal are obtained. The change of the phase of the sensing signal represents the movement amount of the sensing target. Thus, the motion of the sensing target can be grasped with high accuracy. The amount of change in the phase of the sensing signal properly reflects the motion of an object having a large amount of reflection of radio waves. This facilitates recognizing the motion of the sensing target.

A ninth aspect of the invention is a sanitary device according to the eighth aspect of the invention, wherein the integral value is an integral value of the amount of change after operation of the instrument.

In this sanitary device, the change of the integral value due to operation of the instrument can be ignored. Thus, the motion of the sensing target can be recognized accurately.

A tenth aspect of the invention is a sanitary device according to the eighth aspect of the invention, wherein the integral value is an integral value of the amount of change in a period when the frequency of the sensing signal is higher than a prescribed threshold.

In this sanitary device, integration is performed only for the change of the phase in the period when it is determined that the sensing target is definitely in motion. Thus, the motion of the sensing target can be recognized accurately.

Embodiments of the invention will now be described with reference to the drawings. In the drawings, similar components are labeled with like reference numerals, and the detailed description thereof is omitted appropriately.

The sanitary device according to the present embodiment includes a radio wave sensor such as a Doppler sensor operable for emitting high-frequency radio waves. This sanitary device controls the operation of the instrument based on the output of the radio wave sensor. In the following, a toilet device including a sit-down toilet stool is first described as an example of the sanitary device. However, the present embodiment is also applicable to a toilet device including a urinal, and an automatic water faucet device.

FIG. 1 is a perspective view showing a toilet device according to the present embodiment.

Figure 2:
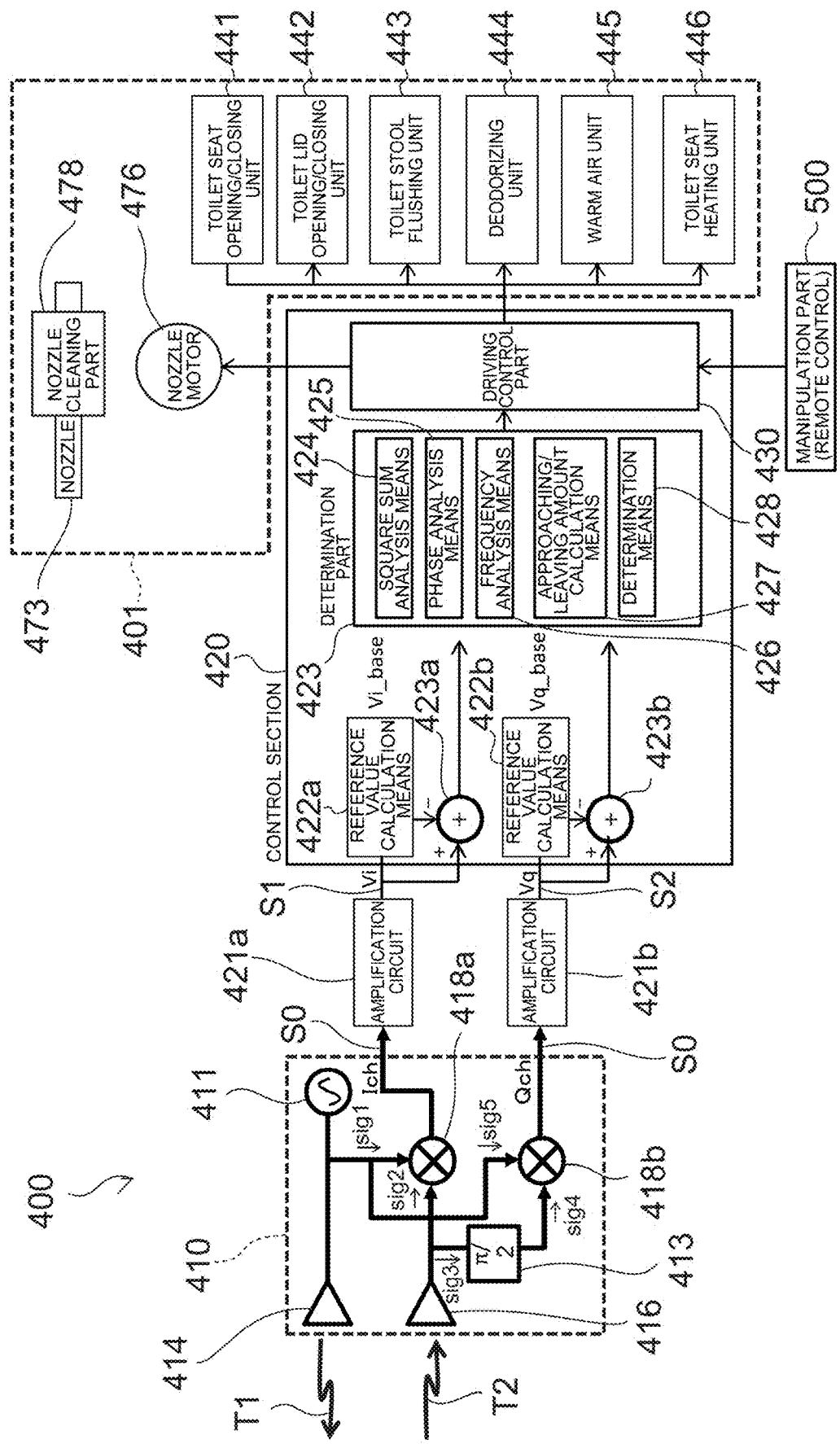
FIG. 2 is a block diagram showing the main configuration of the toilet device according to the present embodiment.

FIG. 2 is a block diagram showing the main configuration of the toilet device according to the present embodiment.

The toilet device shown in FIG. 1 includes a sit-down toilet stool (hereinafter simply referred to as "toilet stool" for convenience of description) 800 and a sanitary flushing device 100 provided thereon. The sanitary flushing device 100 includes a casing 400, a toilet seat 200, and a toilet lid 300. The toilet seat 200 and the toilet lid 300 are each pivotally supported on the casing 400 in an openable/closable manner.

In this description, there are cases of using the term "direction". This "direction" refers to the direction as viewed from a user seated on the toilet seat 200. For instance, the front of the user seated on the toilet seat 200 is referred to as "front", and the rear of the user seated on the toilet seat 200 is referred to as "rear".

As shown in FIG. 2, a radio wave sensor (Doppler sensor 410), a control section 420, and a controlled section 401 are provided inside the casing 400.

The Doppler sensor 410 emits (transmits) high-frequency radio waves such as microwaves or millimeter waves, and receives reflection waves from a sensing target (to-be-sensed body) of the emitted radio waves. The reflection waves include information on the presence or absence and the state of the sensing target. The Doppler sensor 410 outputs a sensing signal based on the emitted radio waves and the reflection waves. The control section 420 outputs a control signal to the controlled section 401 based on the sensing signal outputted from the Doppler sensor 410. Thus, the operation of the controlled section 401 is controlled.

The controlled section 401 includes a cleaning nozzle 473, a nozzle motor 476, a nozzle cleaning part 478, a toilet seat opening/closing unit 441, a toilet lid opening/closing unit 442, a toilet stool flushing unit 443, a deodorizing unit 444, a warm air unit 445, and a toilet seat heating unit 446. In this example, the instrument controlled based on the sensing signal of the Doppler sensor 410 is at least one of the aforementioned components included in the controlled section 401.

The cleaning nozzle 473 can be advanced or retracted in the bowl 801 of the toilet stool 800 under the driving force from the nozzle motor 476. That is, the nozzle motor 476 can advance or retract the cleaning nozzle 473 based on the signal from the control section 420. The cleaning nozzle 473 can squirt cold or warm water from the jetting port 474.

Thus, the cleaning nozzle 473 can clean the user's private parts. The nozzle cleaning part 478 squirts sterilizing water or water from a jetting part, not shown, provided therein. Thus, the nozzle cleaning part 478 can sterilize or clean the outer peripheral surface (body) of the cleaning nozzle 473.

The control section 420 is made of circuits such as a microcomputer. The toilet seat opening/closing unit 441 can open/close the toilet seat 200 based on the signal from the control section 420. The toilet lid opening/closing unit 442 can open/close the toilet lid 300 based on the signal from the control section 420. When the user manipulates a manipulation section 500 such as a remote control, the toilet stool flushing unit 443 can flush the bowl 801 of the toilet stool 800 based on the signal from the control section 420. The deodorizing unit 444 reduces odorous components through e.g. a filter or catalyst. The warm air unit 445 blows warm air toward e.g. the "bottoms" of the user seated on the toilet seat 200 for drying. The toilet seat heating unit 446 blows warm air into the toilet room to heat the toilet room.

As shown in FIG. 1, the Doppler sensor 410 is provided in e.g. the rear of the toilet seat 200. Specifically, the Doppler sensor 410 is provided in the rear of the toilet seat 200 and in a front part inside the casing 400.

As shown in FIG. 2, the Doppler sensor 410 includes an oscillator 411, a transmitter part 414 (antenna), a receiver part 416 (antenna), mixer parts 418a, 418b, and a phase shift means 413. The Doppler sensor 410 is a sensor operable for outputting a sensing signal S0 including an Ich signal and a Qch signal. In this example, the antenna on the transmitting side and the antenna on the receiving side are provided separately. However, the antenna on the transmitting side and the antenna on the receiving side may be provided as a common component.

Radio waves in the frequency band of 10 kHz to 100 GHz such as high-frequency radio waves, microwaves, and millimeter waves are emitted from the transmitter part 414 connected to the oscillator 411. For instance, a transmission wave T1 having a frequency of 10.50-10.55 GHz or 24.05-24.25 GHz is emitted toward the front of the toilet device. The receiver part 416 receives a reflection wave T2 from a sensing target such as a human body.

Part of the transmission wave (signal Sig1) and part of the reception wave (signal Sig2) are inputted to the mixer part 418a and combined with each other. Thus, an Ich signal is outputted.

On the other hand, part of the reception wave (signal Sig3) is inputted to the phase shift means 413. The phase shift means 413 shifts the phase of the signal Sig3 to output a signal Sig4. An example of the phase shift means 413 is to change the length or layout of the interconnect for conveying the reception wave to the mixer part 418b. The phase difference between the signal Sig4 and the signal Sig3 is e.g. not less than 60° and not more than 120°, and preferably as close to 90° as possible. In this example, the phase difference between the signal Sig4 and the signal Sig3 is 90° ($\pi/2$, quarter wavelength). Part of the transmission wave (signal Sig5) and the signal Sig4 are inputted to the mixer part 418b and combined with each other. Thus, a Qch signal is outputted.

Figure 3:
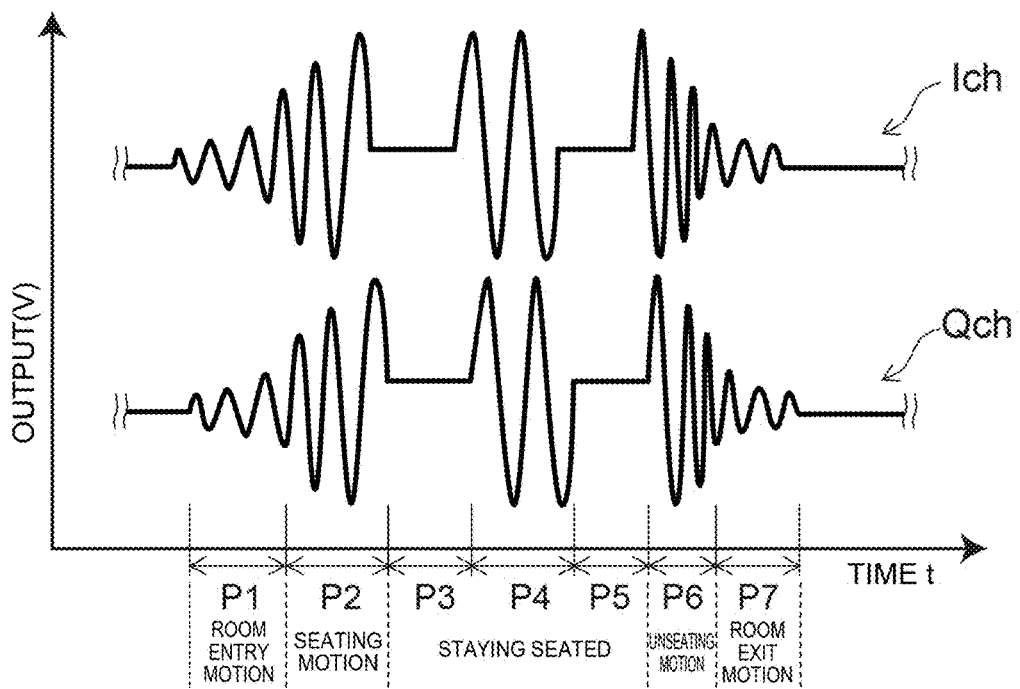
FIG. 3 is a conceptual diagram illustrating the sensing signal of the Doppler sensor.

FIG. 3 is a conceptual diagram illustrating the sensing signal of the Doppler sensor.

In FIG. 3, the horizontal axis represents time t (s, second), and the vertical axis represents the output of the signal (V, volt).

The sensing signal S0 (each of the Ich signal and the Qch signal) has a waveform in which a high-frequency signal is superimposed on a low-frequency baseline.

The sensing signal S0 includes information on the Doppler effect. More specifically, when the transmission wave is reflected by a moving sensing target, the wavelength of the reflection wave is shifted by the Doppler effect. Movement of the sensing target relative to the Doppler sensor 410 results in a sensing signal including a frequency component ΔF proportional to the velocity of the sensing target. Thus, the velocity of the sensing target can be determined by measuring the Doppler frequency ΔF.

Furthermore, the sensing signal S0 also includes information on the standing wave (standing wave signal). More specifically, between the Doppler sensor 410 and the sensing target, a standing wave occurs due to mutual interference between the transmission wave and the reflection wave reflected by the sensing target.

FIG. 3 shows the Ich signal and the Qch signal. The Qch signal is 90° out of phase with the Ich signal.

For instance, in period P1, a user enters the toilet room. At this time, the Doppler sensor 410 receives a reflection wave from the user approaching the Doppler sensor 410. Thus, the sensing signal exhibits oscillation reflecting the Doppler effect. In period P2, the user is seated on the toilet seat 200. At this time, the user further approaches the Doppler sensor 410, and causes oscillation of the sensing signal.

In the periods P3-P5, the user stays seated on the toilet seat 200. In period P3 and period P5, the user is at rest. In period P4, the user makes motions such as leaning forward and swinging the body while staying seated. In such cases, the sensing signal oscillates in accordance with the Doppler effect.

In period P6, the user is unseated from the toilet seat 200. At this time, the user stands up and leaves the Doppler sensor 410. Thus, the sensing signal exhibits oscillation reflecting the Doppler effect. In period P7, the user exits from the toilet room. At this time, the user further leaves the Doppler sensor 410, and causes oscillation of the sensing signal. As shown in FIG. 3, the amplitude of the sensing signal is larger as the distance between the sensing target (user) and the Doppler sensor 410 is shorter.

The Ich signal and the Qch signal as described above are inputted to an amplification circuit 421a and an amplification circuit 421b, respectively, as shown in FIG. 2. Furthermore, a filter circuit (not shown) such as a low-pass filter for removing noise is provided as appropriate between the Doppler sensor 410 and the control section 420. A first signal S1 (voltage Vi) concerning the standing wave is obtained from the Ich signal. That is, the control section 420 obtains a first signal S1 included in the sensing signal. For instance, the first signal S1 indicates the signal intensity of the standing wave and includes the DC component of the Ich signal.

A second signal S2 (voltage Vq) concerning the standing wave is obtained from the Qch signal. That is, the control section 420 obtains a second signal S2 included in the sensing signal. For instance, the second signal S2 indicates the signal intensity of the standing wave and includes the DC component of the Qch signal.

Thus, the sensing signal is amplified, and the noise is removed. Accordingly, a first signal S1 and a second signal S2 are obtained. The amplification circuit and the filter circuit may be included in the control section 420.

The control section 420 determines the presence or absence and the state (motion) of the sensing target based on the obtained first signal S1 and second signal S2. The control section 420 outputs a control signal to the controlled section 401 based on the determination result. Thus, for instance, upon sensing room entry of a user, the toilet lid 300 is automatically opened. Upon sensing room exit of a user, the toilet lid 300 is automatically closed. Furthermore, for instance, when the Doppler sensor 410 senses seating of a user, the user may manipulate the manipulation section 500. Then, the cleaning nozzle 473 is advanced into the bowl 801, and cold or warm water is squirted from the jetting port 474. Furthermore, for instance, the toilet stool flushing unit 443 and the deodorizing unit 444 are controlled upon sensing unseating of a user.

Figure 4A:
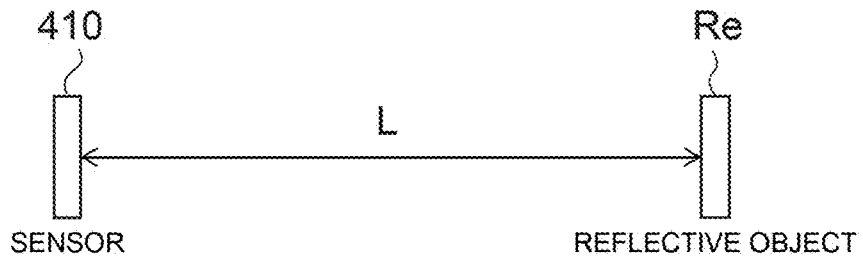
FIGS. 4A and 4B are conceptual diagrams describing the first signal S1 and the second signal S2 according to the embodiment.
Figure 4B:
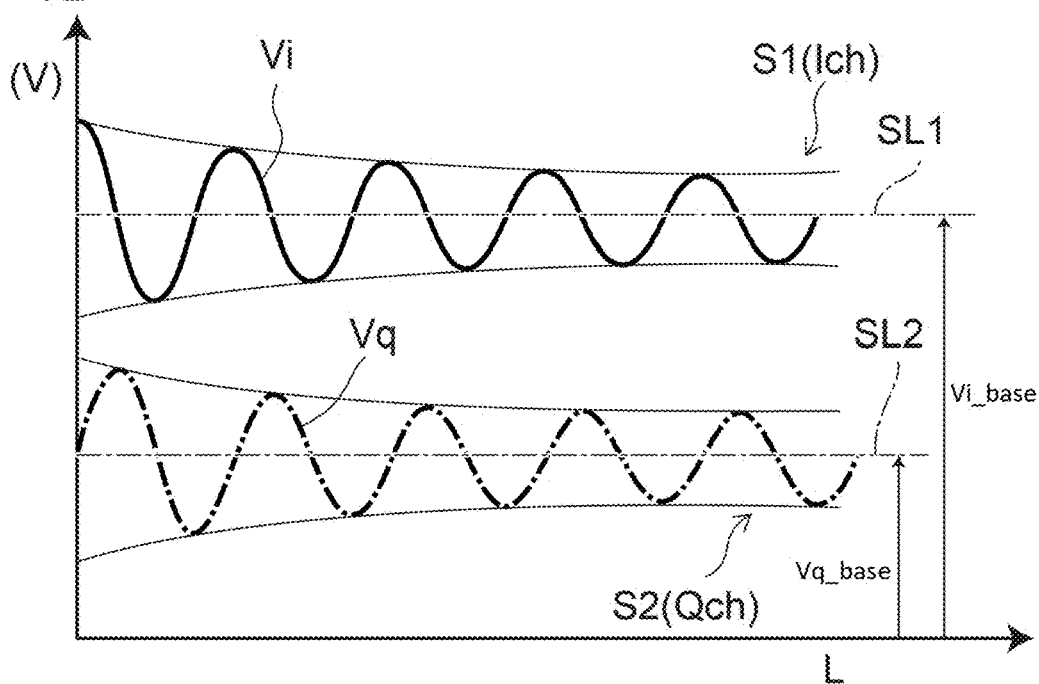

FIGS. 4A and 4B are conceptual diagrams describing the first signal S1 and the second signal S2 according to the embodiment.

As shown in FIG. 4A, the Doppler sensor 410 emits radio waves toward a reflective object Re (e.g., a sensing target such as a human body) separated by a distance L, and receives the reflection wave thereof. Here, the reflective object Re is e.g. at rest. Irrespective of whether the sensing target is moving or at rest, a standing wave occurs between the Doppler sensor 410 and the sensing target due to interference between the transmission wave and the reflection wave. Thus, the first signal S1 and the second signal S2 including information of the standing wave can be sensed even if the sensing target is at rest.

FIG. 4B shows the variation of the value of the first signal S1 (voltage Vi) with respect to the distance L between the stationary reflective object Re and the Doppler sensor 410. FIG. 4B also shows the variation of the value of the second signal S2 (voltage Vq) with respect to the distance L. The phase difference between the first signal S1 and the second signal S2 is 90°. The first signal S1 oscillates about the signal level SL1 when the distance L changes. The second signal S2 oscillates about the signal level SL2 when the distance L changes.

The signal level SL1 and the signal level SL2 each depend on the environment around the Doppler sensor 410. For instance, the toilet room contains reflective objects reflecting radio waves other than the sensing target (human body). Thus, the sensing signal of the Doppler sensor 410 is affected by e.g. interference between the reflection wave from the human body and the reflection wave from the other reflective objects. Furthermore, the electrical characteristics of the components included in the Doppler sensor 410 (such as the phase shift means 413 and the mixer parts 418a, 418b) depend on e.g. the ambient temperature. Thus, the sensing signal of the Doppler sensor 410 is affected also by the ambient temperature. Accordingly, the signal level SL1 and the signal level SL2 each change with the ambient environment, and may be different from each other.

The intensity of the reflection wave received by the Doppler sensor 410 is lower as the distance L to the reflective object is longer. Thus, the amplitude of the first signal S1 about the signal level SL1 is smaller as the distance L is longer. Likewise, the amplitude of the second signal S2 about the signal level SL2 is smaller as the distance L is longer.

Next, determination of the presence or absence and the state (motion) of the sensing target based on the first signal S1 and the second signal S2 is described.

As shown in FIG. 2, the control section 420 includes reference value calculation means 422a, 422b, difference calculation means 423a, 423b, a determination part 423, and a driving control part 430. The determination part 423 includes a square sum analysis means 424, a phase analysis means 425, a frequency analysis means 426, an approaching/leaving amount calculation means 427, and a determination means 428. The block diagram shown in FIG. 2 is illustrative only, and the embodiment is not limited thereto. For instance, part of the functional blocks included in the control section 420 may be divided or integrated as appropriate. For instance, the determination part 423 and the driving control part 430 may be provided separately.

The first signal S1 is inputted to the reference value calculation means 422a and the difference calculation means 423a. The reference value calculation means 422a determines a signal level SL1 from the first signal S1, and outputs its voltage value as a reference value Vi_base (first reference value) to the difference calculation means 423a. The difference calculation means 423a calculates the difference (voltage $V_I$) between the voltage Vi of the first signal S1 and the reference value Vi_base. That is, $V_I$=Vi–Vi_base is calculated. The voltage $V_I$ is inputted to the determination part 423.

Likewise, the second signal S2 is inputted to the reference value calculation means 422b and the difference calculation means 423b. The reference value calculation means 422b determines a signal level SL2 from the second signal S2, and outputs its voltage value as a reference value Vq_base (second reference value) to the difference calculation means 423b. The difference calculation means 423b calculates the difference (voltage $V_Q$) between the voltage Vq of the second signal S2 and the reference value Vq_base. That is, $V_Q$=Vq–Vq_base is calculated. The voltage $V_Q$ is inputted to the determination part 423.

For instance, the Doppler sensor 410 performs measurement and outputs a sensing signal approximately every 1-3 ms (milliseconds). The first signal S1 and the second signal S2 are inputted to the control section 420 e.g. approximately every 1-3 ms. Accordingly, the voltage $V_I$ and the voltage $V_Q$ are inputted to the determination part 423 e.g. approximately every 1-3 ms.

Figure 5A:
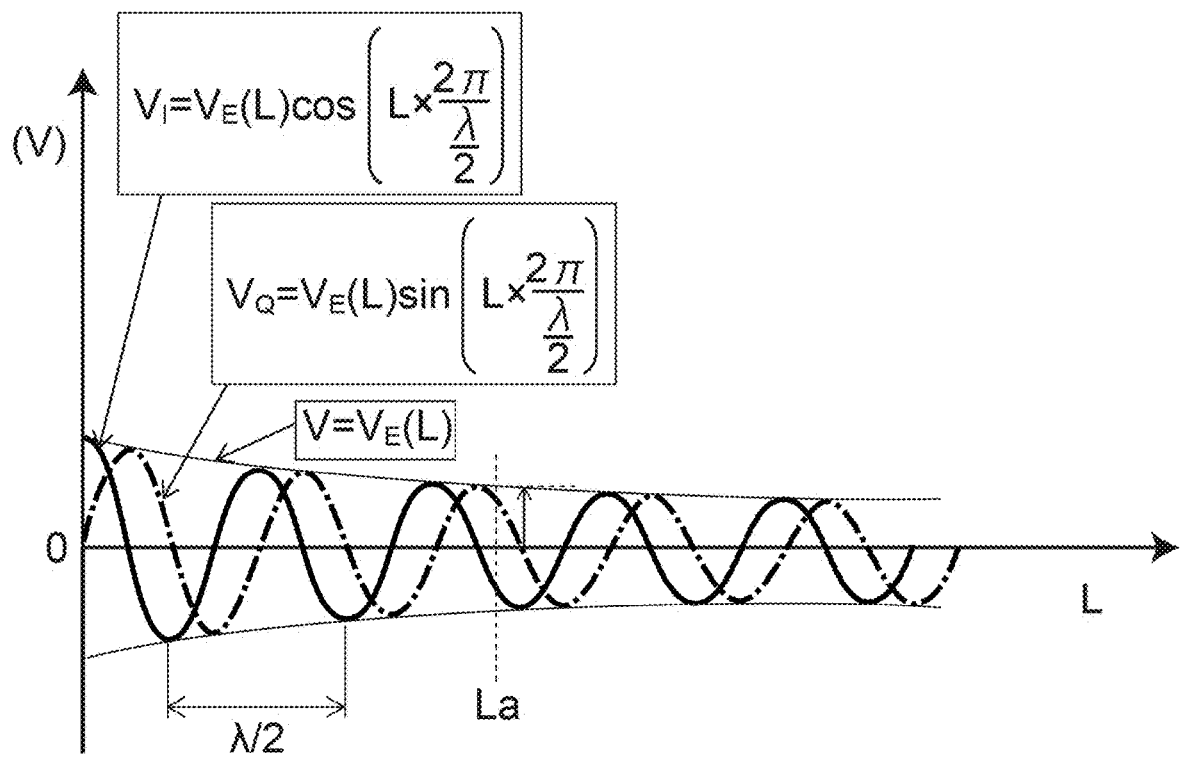
FIGS. 5A and 5B are graphs describing the processing of the determination part according to the embodiment.
Figure 5B:
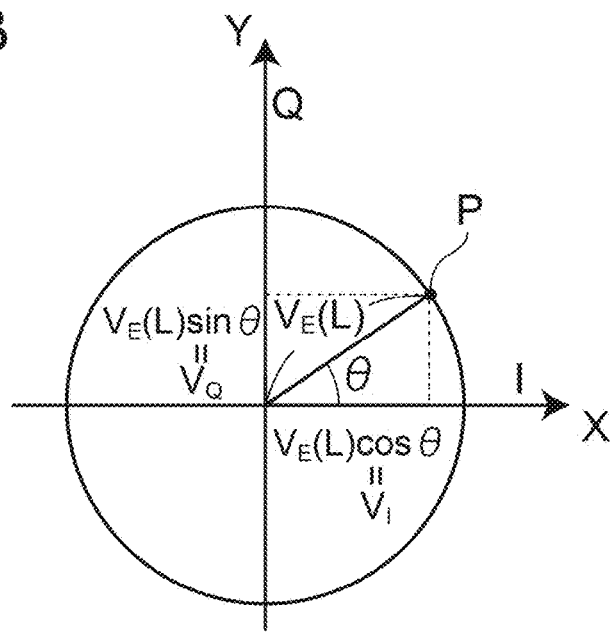

FIGS. 5A and 5B are graphs describing the processing of the determination part according to the embodiment.

FIG. 5A shows the variation of the voltage $V_I$ and the voltage $V_Q$ with respect to the distance L. That is, in FIG. 5A, the offset is removed from the voltages Vi and Vq shown in FIG. 4B.

The square sum analysis means 424 calculates the sum of squares of the voltage $V_I$ and the voltage $V_Q$. More specifically, the square sum analysis means 424 calculates the following.

$$V_E^2 = V_I^2 + V_Q^2 \quad (1)$$
$$= |Vi - Vi\_base|^2 + |Vq - Vq\_base|^2$$

As shown in FIG. 5A, the voltage $V_E$ represents the amplitude of the voltage $V_I$ and the voltage $V_Q$. In FIG. 5A, the waveform of the voltage $V_E$ is shaped like a curve connecting the maximal values of the waveform of the voltage $V_I$ (or voltage $V_Q$). FIG. 5B shows a point P in the XY orthogonal coordinate system, where the X-coordinate represents the value of the voltage $V_I$, and the Y-coordinate represents the value of the voltage $V_Q$. The radius of the point P represented in the polar coordinate system corresponds to the voltage $V_E$.

As described above, the amplitude (voltage $V_E$) of the voltage $V_I$ and the voltage $V_Q$ depends on the distance L. Thus, the distance L between the sensing target and the Doppler sensor 410 can be calculated by calculating the voltage $V_E$.

If the sensing target is at rest, e.g., if the distance L=La (constant), then only the voltage $V_I$ and the voltage $V_Q$ at distance L=La can be obtained from the sensing signal of the Doppler sensor 410. That is, when the sensing target is at rest, the waveform of the voltage $V_I$ and the waveform of the voltage $V_Q$ as shown in FIG. 5A are not measured. Thus, the amplitude (voltage $V_E$) cannot be calculated from the maximal values as shown in FIG. 5A. In this method, it is difficult to determine the distance to the sensing target and the presence or absence of the sensing target when the sensing target is at rest.

In contrast, in the embodiment, as shown in FIG. 5B, the voltage $V_E$ is calculated based on the sum of the square of the difference between the first signal S1 and the reference value and the square of the difference between the second signal S2 and the reference value. Thus, even when the sensing target is at rest, the presence or absence of the sensing target can be determined accurately, and the distance to the sensing target can be calculated. For instance, in the toilet device, it is possible to determine accurately whether or not a user is present in the toilet room, and whether or not the user stays seated.

Figure 6A:
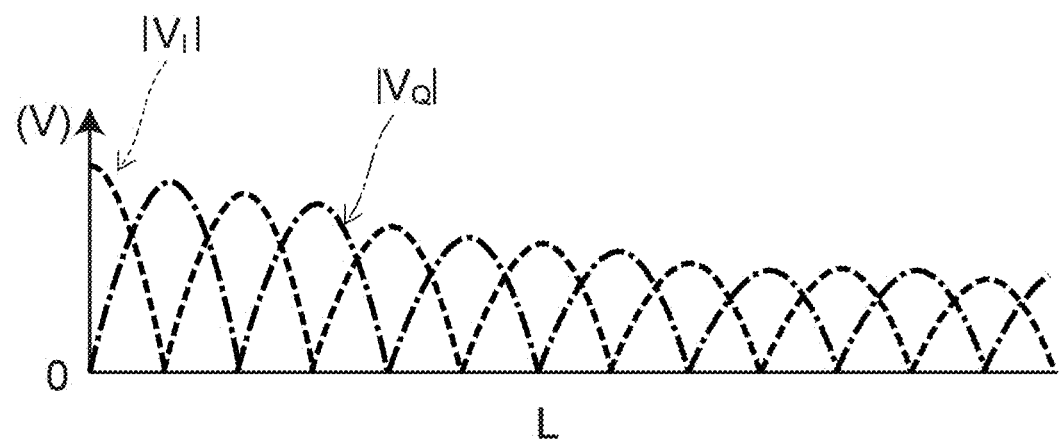
FIGS. 6A and 6B are graphs showing a method of a reference example for calculating the distance to the sensing target using a Doppler sensor.
Figure 6B:
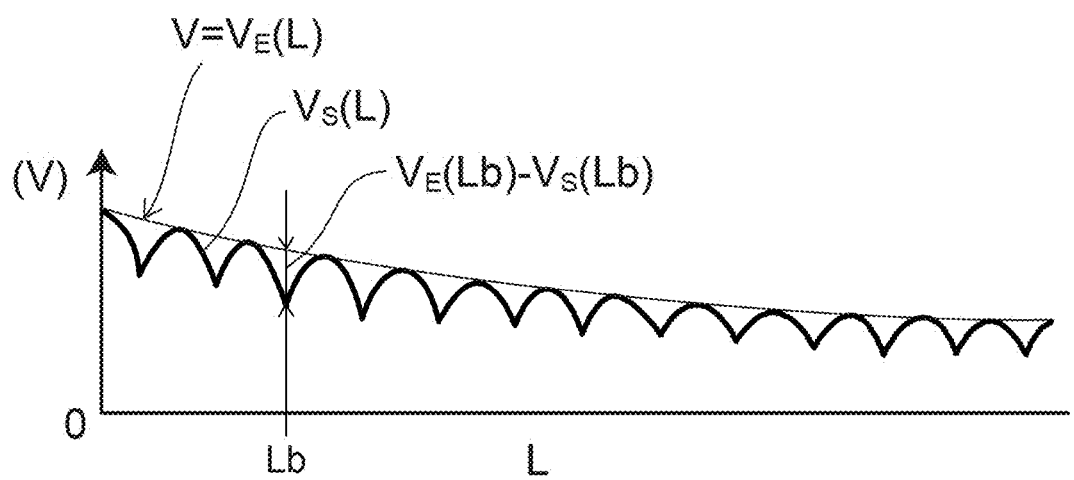

FIGS. 6A and 6B are graphs showing a method of a reference example for calculating the distance to the sensing target using a Doppler sensor.

FIG. 6A shows signals $|V_I|$ and $|V_Q|$ obtained by full-wave rectifying the voltage $V_I$ and the voltage $V_Q$ shown in FIG. 5A. FIG. 6B shows a combined signal $V_S$ of $|V_I|$ and $|V_Q|$. The combined signal $V_S$ is a signal having the larger value of $|V_I|$ and $|V_Q|$ at a given distance L.

As seen from FIG. 6B, the combined signal $V_S$ approximates the voltage $V_E$. Thus, when the waveforms of the voltage $V_I$ and the voltage $V_Q$ in response to the movement of the sensing target is measured, the distance L can be estimated by calculating the combined signal $V_S$. In this method, the detection accuracy can be improved by using a plurality of outputs with different phases.

However, for instance, at distance L=Lb shown in FIG. 6B, the difference between the voltage $V_E$ and the combined signal $V_S$ is relatively large. That is, the error of the estimated distance to the sensing target is relatively large. When two signals different in phase by 90° from each other are used, the difference between the voltage $V_E$ and the combined signal $V_S$ may reach approximately 29% of the voltage $V_E$ at the maximum.

In contrast, in the embodiment, $V_E$ can be calculated from $V_I^2+V_Q^2$. Thus, the error as described above does not occur. Accordingly, the accuracy can be further improved compared with the method of the reference example. If the phase difference between the first signal S1 and the second signal S2 is 90°, then $V_I^2+V_Q^2=V_E^2$. However, the error of $V_I^2+V_Q^2$ with respect to $V_E^2$ increases with the deviation of the phase difference from 90°. When the phase difference is not less than 60° and not more than 120°, the calculation error of the voltage $V_E$ can be made approximately 29% or less. The phase difference is preferably as close to 90° as possible.

The phase analysis means 425 calculates the phase θ of the sensing signal of the Doppler sensor 410. For instance, the phase θ is an argument of the polar coordinates of the point P shown in FIG. 5B. The phase analysis means 425 calculates the phase θ by equations (2)-(6).

$$\theta'=\tan^{-1}(|Vq-Vq\_base|/|Vi-Vi\_base|) \quad (2)$$

$$\theta=\theta'(\text{for point } P \text{ located in the first quadrant}) \quad (3)$$

$$\theta=\pi-\theta'(\text{for point } P \text{ located in the second quadrant}) \quad (4)$$

$$\theta=\pi+\theta' \text{(for point } P \text{ located in the third quadrant)} \quad (5)$$

$$\theta=2\pi-\theta' \text{(for point } P \text{ located in the fourth quadrant)} \quad (6)$$

The phase θ changes with the change of the distance L from the Doppler sensor 410 to the sensing target. The movement of the sensing target can be sensed by sensing the change of the phase θ. The amount of change in the distance L (i.e., the movement distance of the sensing target) can be calculated from the amount of change in the phase θ.

The amount of change in the distance L can also be calculated from the waveform of the voltage $V_I$ (or the waveform of the voltage $V_Q$) shown in FIG. 5A. The wavelength of the radio wave emitted by the Doppler sensor 410 is denoted by λ. Then, the length of one wave in the waveform of the voltage $V_I$ shown in FIG. 5A is λ/2. That is, the difference between the distance L giving one maximal value and the distance L giving the adjacent maximal value is λ/2. For instance, the frequency of the radio wave emitted by the Doppler sensor 410 is approximately 24 GHz. Then, λ/2 is equal to approximately 6.2 mm. Thus, the movement distance of the sensing target can be calculated by counting the number of waves. Furthermore, for instance, the change of the aforementioned phase θ by 360° corresponds to the change of the distance L by λ/2.

The method for counting the number of waves in the waveform of the voltage $V_I$ shown in FIG. 5A may be the method of counting the number of maximal values or the number of minimal values (peak sensing), or the method of counting the number of times the voltage $V_I$ becomes zero (zero-cross sensing). However, peak sensing and zero-cross sensing calculate the movement distance of the sensing target as e.g. a multiple of λ/2. Thus, it is difficult to grasp the movement of the sensing target with high accuracy when the movement distance of the sensing target is shorter than λ/2.

In contrast, in the embodiment, the phase θ is calculated based on the first signal S1 and the second signal S2. Even when the sensing target is at rest, the phase θ can be calculated each time the first signal S1 and the second signal S2 are obtained. The amount of change in the phase θ can be calculated even when the change of the distance L falls short of λ/2, i.e., when the amount of change in the phase θ is less than 360°. Thus, the amount of change in the phase θ can be calculated even for a slight change of the distance L. Accordingly, the movement of the sensing target can be grasped with high accuracy.

The frequency analysis means 426 calculates the frequency f of the sensing signal of the Doppler sensor 410. The frequency f corresponds to the amount of change per unit time in the phase θ calculated by the phase analysis means 425. More specifically, the frequency analysis means 426 calculates the frequency f by equations (7) and (8).

$$f=\Delta\theta/(2\pi\times\Delta t) \quad (7)$$

$$\Delta\theta=\theta(n)-\theta(n-1) \quad (8)$$

Here, θ(n) is the phase θ calculated from the n-th sensing signal. θ(n−1) is the phase θ calculated from the (n−1)-th sensing signal. Δt is the interval between the obtained time of the n-th sensing signal and the obtained time of the (n−1)-th sensing signal. Δt is e.g. approximately 1-3 ms. Here, the frequency f may be calculated a plurality of times by equations (7) and (8), and the calculated values may be averaged.

Δθ (amount of change in the phase θ) represents the movement distance of the sensing target. Thus, the frequency f represents the movement velocity of the sensing target. The frequency f can be calculated like the phase θ even for a slight change of the distance L. Thus, the movement of the sensing target can be grasped with high accuracy. Here, for instance, the value of Δθ is assumed to be positive when the sensing target approaches the Doppler sensor 410. The value of Δθ is assumed to be negative when the sensing target leaves the Doppler sensor 410.

The approaching/leaving amount calculation means 427 calculates the integral value $S_\theta$ of Δθ in a prescribed period. As described before, Δθ represents the amount of change in the distance L. Thus, the movement distance of the sensing target in the prescribed period can be calculated by the integral value $S_\theta$. More specifically, the integral value $S_\theta$ is the movement amount indicating the distance (approaching amount) of the sensing target having approached the Doppler sensor 410 or the distance (leaving amount) of the sensing target having left the Doppler sensor 410. Examples of the prescribed period will be described later.

The determination means 428 determines the presence or absence and the state of the sensing target using the voltage $V_E$, the frequency f, and the phase θ described above. For instance, room entry or exit, seating, and unseating of a user are determined. The determination condition for each determination will be described later.

The determination result of the determination means 428 is inputted to the driving control part 430. The driving control part 430 outputs a control signal to the controlled section 401 based on the inputted signal concerning the determination result and the signal from the manipulation section 500.

Figure 7A:
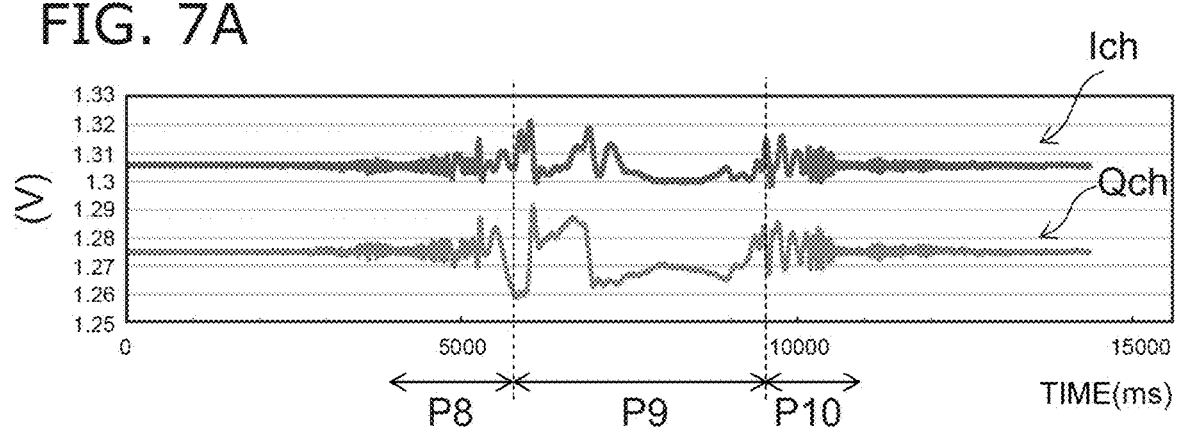
FIGS. 7A to 7C are graphs describing the processing of the control section in the case where the user performs a seating motion and an unseating motion.
Figure 7B:
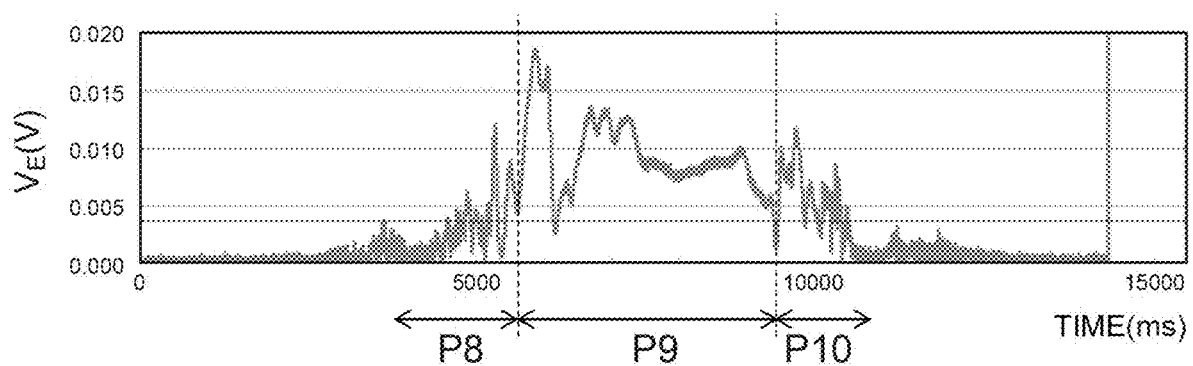
Figure 7C:
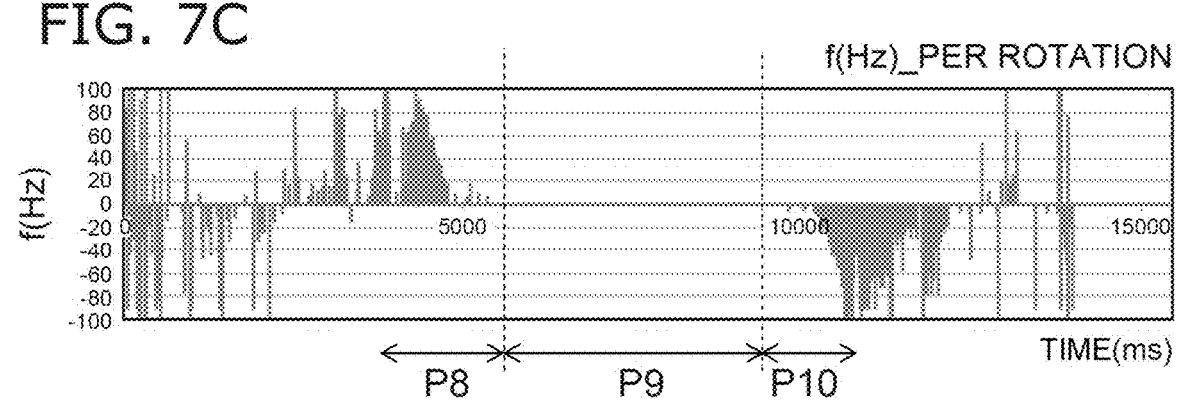

FIGS. 7A to 7C are graphs describing the processing of the control section in the case where the user performs a seating motion and an unseating motion.

FIG. 7A shows an Ich signal and a Qch signal outputted from the Doppler sensor 410. FIG. 7B shows the voltage $V_E$ calculated from the Ich signal and the Qch signal shown in FIG. 7A. In period P8, the user performs a seating motion onto the toilet seat 200. In period P9, the user stays seated on the toilet seat 200. In period P10, the user performs an unseating motion from the toilet seat 200. As shown in FIG. 7B, when the user performs a seating motion, the distance between the user and the Doppler sensor 410 becomes shorter. This increases the voltage $V_E$. Then, while the user stays seated, the voltage $V_E$ is maintained at a high value. When the user performs an unseating motion, the distance between the user and the Doppler sensor 410 becomes longer. This decreases the voltage $V_E$.

The determination means 428 of the control section 420 determines that a user is present in the toilet room (human body sensing) when e.g. the value of the voltage $V_E$ is larger than a prescribed threshold $V_{th1}$ (>0). The determination means 428 determines that a user is absent in the toilet room (human body unsensing) when e.g. the value of the voltage $V_E$ is smaller than the threshold $V_{th1}$. It can be determined from human body sensing and human body unsensing that a user has entered the toilet room or exited from the toilet room (room entry determination, room exit determination).

The determination means 428 determines that a user stays seated (seating sensing) when e.g. the value of the voltage $V_E$ is larger than a prescribed threshold $V_{th2}$ (>$V_{th1}$). The determination means 428 determines that a user is not seated (seating unsensing) when e.g. the value of the voltage $V_E$ is smaller than the threshold $V_{th2}$. It can be determined that a user has stood up from the toilet seat 200 or has been seated on the toilet seat 200 from seating sensing and seating unsensing (unseating determination, seating determination).

FIG. 7C shows the frequency f calculated from the Ich signal and the Qch signal shown in FIG. 7A. In FIG. 7C, the value of the frequency f is assumed to be positive when the user approaches the Doppler sensor 410. The value of the frequency f is assumed to be negative when the user leaves the Doppler sensor 410. In this description, unless otherwise specified, the frequency f is the absolute value of the value calculated from equation (7).

As shown in FIG. 7C, when the user performs a seating motion, the user approaches the Doppler sensor 410. This makes the value of the frequency f positive. While the user stays seated, the change of the distance between the user and the Doppler sensor 410 is small. Thus, the frequency f is generally zero. When the user performs an unseating motion, the user leaves the Doppler sensor 410. This makes the value of the frequency f negative.

The determination can be based on not only the voltage $V_E$ but also the frequency f. For instance, in period P10, the voltage $V_E$ is low, and (the absolute value of) the frequency f is large. In this case, the determination means 428 can determine that the user has performed unseating. Thus, the accuracy of the determination can be improved by also using the frequency f for determination.

Figure 8A:
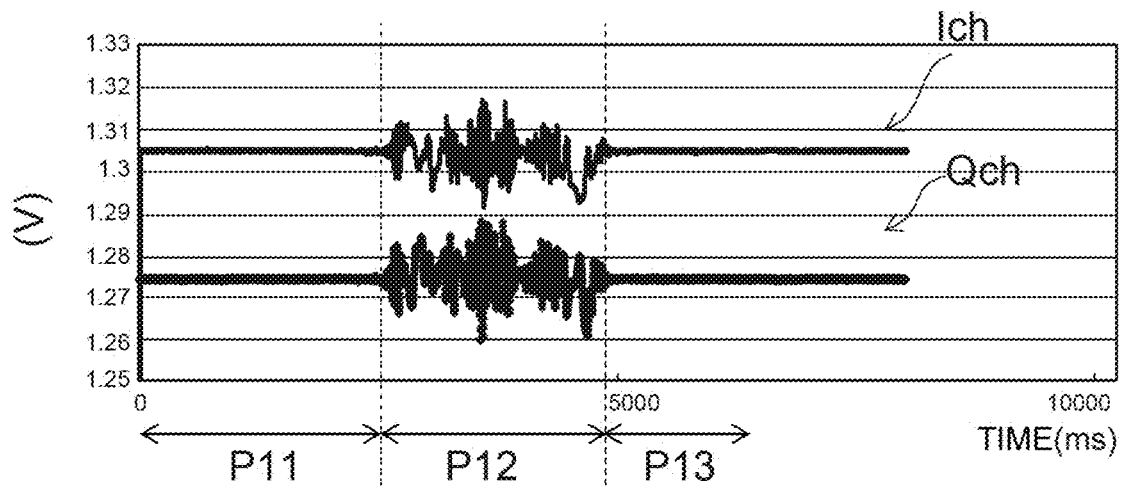
FIGS. 8A to 8C are graphs describing the processing of the control section in the case where the user cleans the toilet stool.
Figure 8B:
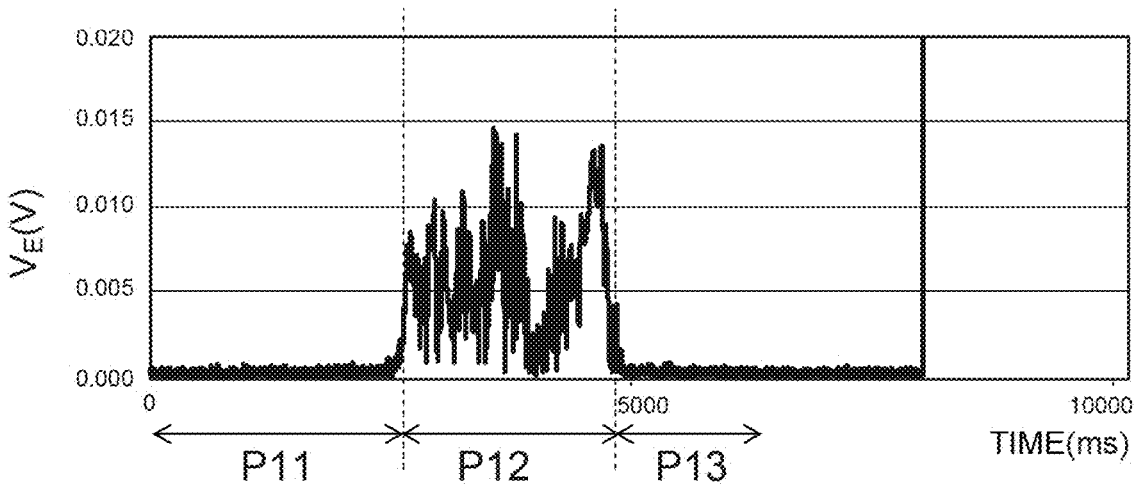
Figure 8C:
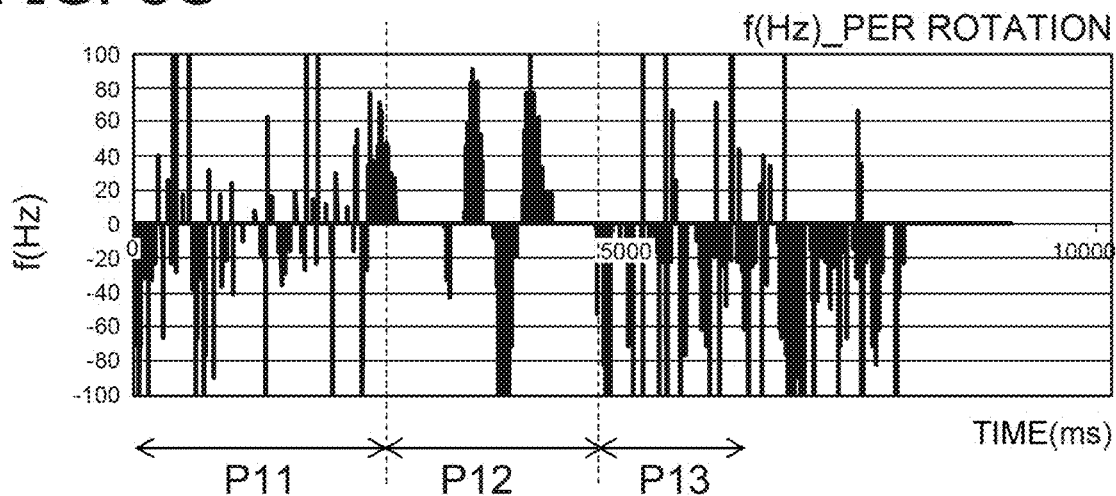

FIGS. 8A to 8C are graphs describing the processing of the control section in the case where the user cleans the toilet stool.

FIG. 8A shows an Ich signal and a Qch signal outputted from the Doppler sensor 410. FIG. 8B shows the voltage $V_E$ calculated from the Ich signal and the Qch signal shown in FIG. 8A. FIG. 8C shows the frequency f calculated from the Ich signal and the Qch signal shown in FIG. 8A. In period P11, the user is standing on the lateral side of the toilet stool 800. In period P12, the user stoops and cleans the toilet stool 800. In period P13, the user stands up again on the lateral side of the toilet stool 800.

As described before, in this example, the Doppler sensor 410 emits radio waves toward the front. Thus, in period P11, the user standing on the lateral side of the toilet stool 800 does not reflect the radio waves. Accordingly, as shown in FIG. 8B, the voltage $V_E$ is low in period P11. When the user stoops for cleaning in period P12, the radio waves emitted from the Doppler sensor 410 are reflected by the user. This increases the voltage $V_E$. Subsequently, when the user stands up in period P13, the voltage $V_E$ decreases again. At this time, as shown in FIG. 8C, in period P13, (the absolute value of) the frequency f increases in response to the rising motion of the user.

Also in the example shown in FIGS. 8A to 8C, for instance, in period P13, the frequency f is high, and the voltage $V_E$ is low. In this case, the determination means 428 can determine that the user is not seated.

FIGS. 9A to 9D are graphs describing the processing of the control section in the case where the user performs a seating motion and an unseating motion.

Figure 9A:
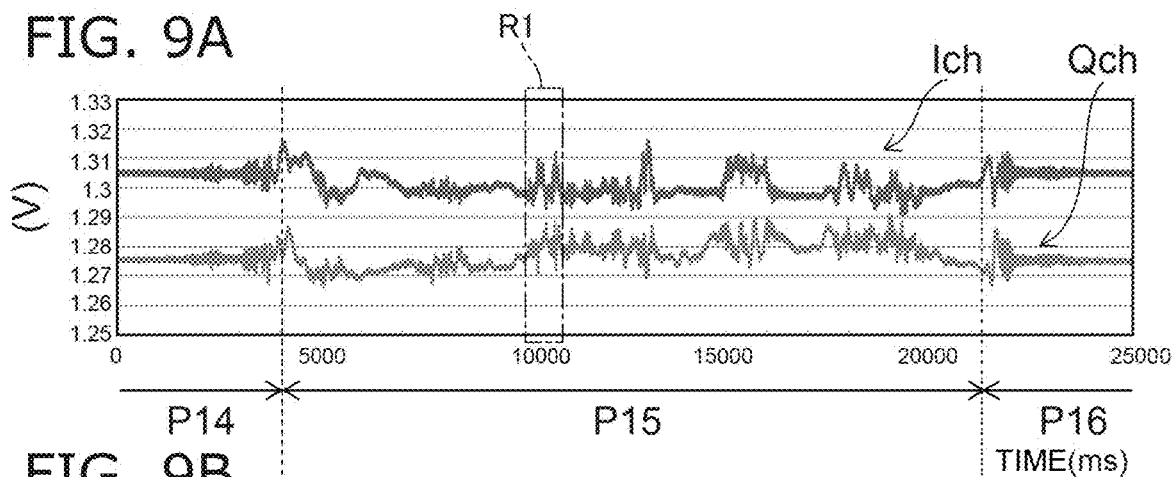
FIGS. 9A to 9D are graphs describing the processing of the control section in the case where the user performs a seating motion and an unseating motion.
Figure 9B:
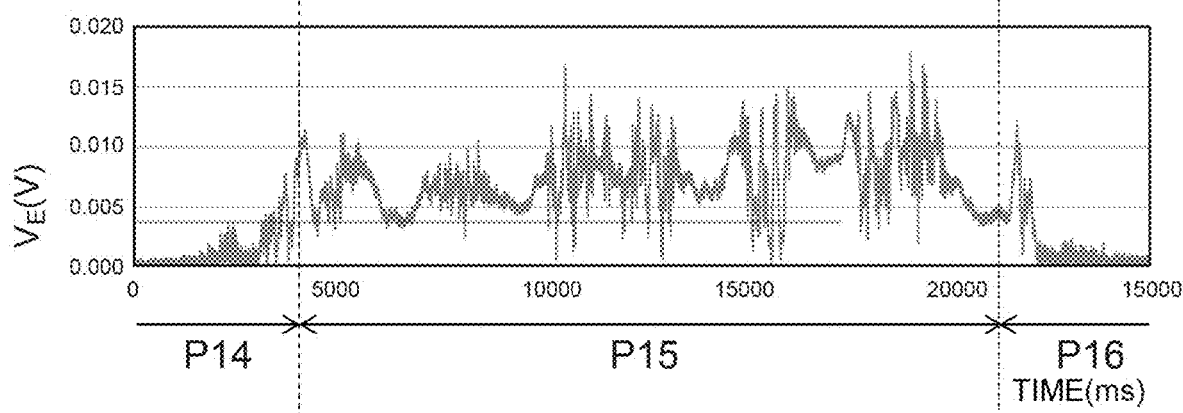
Figure 9C:
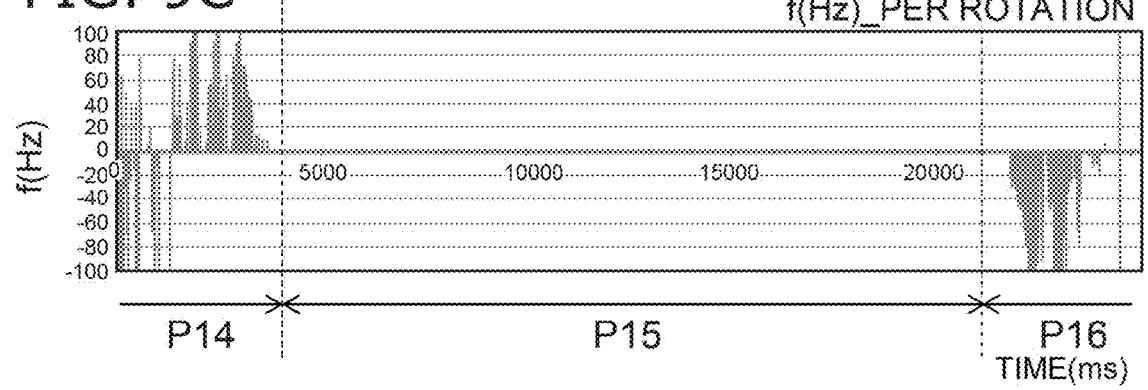
Figure 9D:
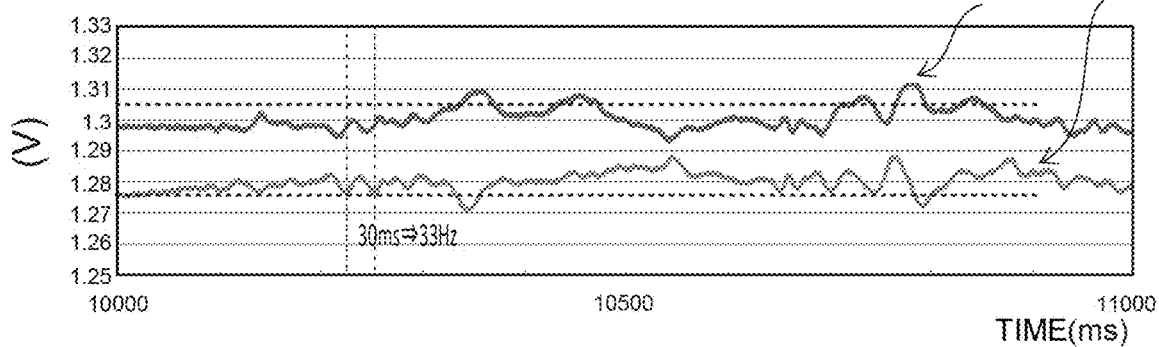

FIG. 9A shows an Ich signal and a Qch signal outputted from the Doppler sensor 410. FIG. 9B shows the voltage $V_E$ calculated from the Ich signal and the Qch signal shown in FIG. 9A. FIG. 9C shows the frequency f calculated from the Ich signal and the Qch signal shown in FIG. 9A. FIG. 9D is an enlarged graph of region R1 shown in FIG. 9A.

In period P14, the user performs a seating motion onto the toilet seat 200. In period P15, the user stays seated on the toilet seat 200. In this example, the seated user is not at rest, but performs a motion such as scratching the back. That is, in period P15, the user moves the hand generally continuously. In period P16, the user performs an unseating motion from the toilet seat 200.

The variation of the voltage $V_E$ in period P14 and the variation of the voltage $V_E$ in period P16 are similar to the variation of the voltage $V_E$ in period P8 and the variation of the voltage $V_E$ in period P10 in FIG. 7B, respectively.

Likewise, the variation of the frequency f in period P14 and the variation of the frequency f in period P16 are similar to the variation of the frequency f in period P8 and the variation of the frequency f in period P10 in FIG. 7B, respectively.

In period P15, the user stays seated. Thus, the distance between the user and the Doppler sensor 410 is short. Accordingly, the voltage $V_E$ is high as shown in FIG. 9B. At this time, the user's hand is moving generally continuously. Thus, the sensing signal outputted from the Doppler sensor 410 includes a component corresponding to this motion of the hand. For instance, as in the graph enlarged in FIG. 9D, the output of the Doppler sensor 410 includes a high-frequency component corresponding to the motion of the hand. However, as shown in FIG. 9C, in terms of the frequency f, the component corresponding to the motion of the user's hand is small, e.g., with a substantially negligible magnitude. Thus, in period P15, the frequency f is generally zero.

Thus, the change of the frequency f due to the motion of the body such as seating and unseating is large. However, the change of the frequency f due to fine motions such as the motion of the hand is small. This is described with reference to FIG. 10.

Figure 10:
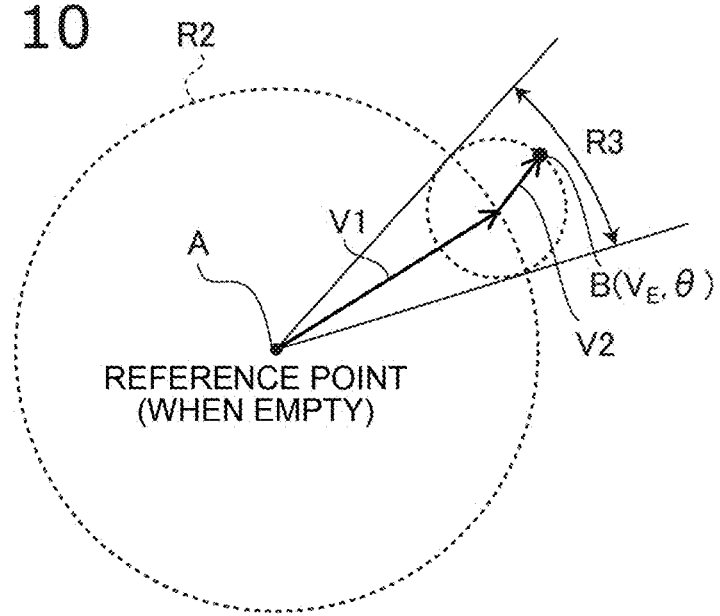
FIG. 10 is a conceptual diagram of the signal analyzed by the control section according to the embodiment.

FIG. 10 is a conceptual diagram of the signal analyzed by the control section according to the embodiment.

FIG. 10 corresponds to the polar coordinate system described with reference to FIG. 5B. When the Doppler sensor 410 senses no user, the voltage $V_E$ is e.g. zero. At this time, as represented by point A in FIG. 10, the point with the radius equal to the voltage $V_E$ is located at the reference point (e.g., origin). When the Doppler sensor 410 senses a user, the point with the radius equal to the voltage $V_E$ comes to e.g. point B in FIG. 10. That is, in the polar coordinate system, the magnitude of the position vector of point B is equal to the value of the voltage $V_E$. When the Doppler sensor 410 senses the (approaching or leaving) motion of the user, the phase $\theta$ changes. That is, point B rotates about the reference point.

As described before, the voltage $V_E$ (amplitude determined from the first signal S1 and the second signal S2) is determined by the intensity of the reflection wave received by the Doppler sensor 410. For instance, the voltage $V_E$ can be separated into a component resulting from the reflection wave from the user's body and a component resulting from the reflection wave from the user's hand. That is, the position vector of point B can be decomposed into a vector V1 (signal vector associated with the approaching of the body) and a vector V2 (signal vector associated with the motion of the hand).

In general, the user's body is larger than the user's hand. Thus, the intensity of the reflection wave from the user's body is higher than the intensity of the reflection wave from the user's hand. Accordingly, the magnitude of the vector V1 is larger than the magnitude of the vector V2. When the user's body moves, the vector V1 rotates. Thus, the phase $\theta$ indicating the position of point B changes in the range of 360° about the reference point as represented by e.g. range R2 shown in FIG. 10. On the other hand, when the user's hand moves with the user's body at rest, the vector V2 changes without change of the vector V1. At this time, the phase θ indicating the position of point B changes about the reference point as represented by e.g. range R3 shown in FIG. 10.

Thus, the vector V2 is smaller than the vector V1. Accordingly, the range R3 of change of the phase θ associated with the motion of the user's hand is narrow. As described above, the change of the phase θ reflects the motion of an object having a large amount of reflection of radio waves (such as a body), and is less affected by the motion of an object having a small amount of reflection of radio waves (such as a hand). The influence of the motion of the hand on the phase θ is e.g. negligible. Thus, for instance, fine motions of the seated user can be distinguished from the unseating motion with high accuracy.

Next, calculation of the reference value of the first signal S1 and the reference value of the second signal S2 is described with reference to FIGS. 11A to 13B.

Figure 11A:
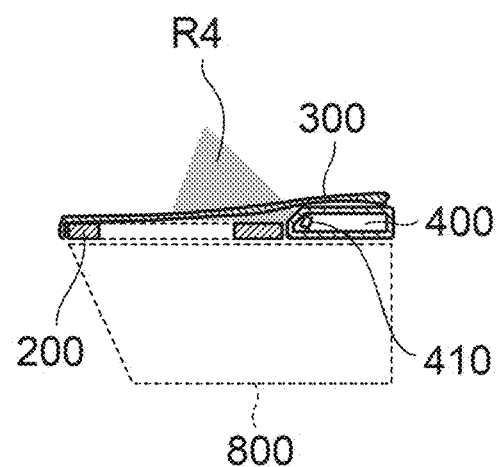
FIGS. 11A to 11C are sectional views showing the toilet device according to the present embodiment.
Figure 11B:
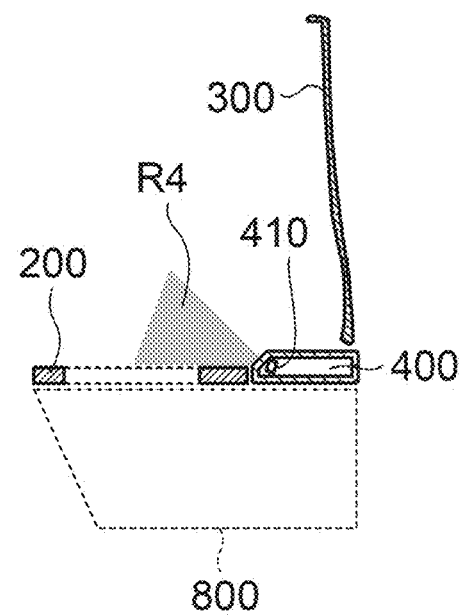
Figure 11C:
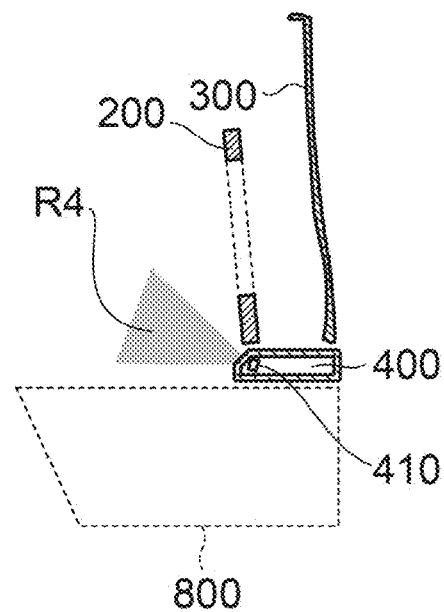

FIGS. 11A to 11C are sectional views showing the toilet device according to the present embodiment.

The range R4 shown in FIGS. 11A to 11C indicates the direction of the radio waves emitted from the Doppler sensor 410.

FIG. 11A shows the state in which the toilet lid 300 and the toilet seat 200 are closed. In this state, part of the radio waves emitted from the Doppler sensor 410 are reflected by the toilet lid 300 and the toilet seat 200. FIG. 11B shows the state in which the toilet lid 300 is opened and the toilet seat 200 is closed. In this state, part of the radio waves emitted from the Doppler sensor 410 are not reflected by the toilet lid 300, but reflected by the toilet seat 200. FIG. 11C shows the state in which the toilet lid 300 and the toilet seat 200 are opened. In this state, part of the radio waves emitted from the Doppler sensor 410 are not reflected by the toilet lid 300 and the toilet seat.

As described before, the signal level SL1 of the first signal S1 and the signal level SL2 of the second signal S2 each change with the environment around the Doppler sensor 410. Thus, the signal level SL1 in the respective states shown in FIGS. 11A to 11C may be different from each other. Furthermore, the signal level SL2 in the respective states shown in FIGS. 11A to 11C may be different from each other. Likewise, the signal level SL1 and the signal level SL2 may also change with temperature.

Figure 12A:
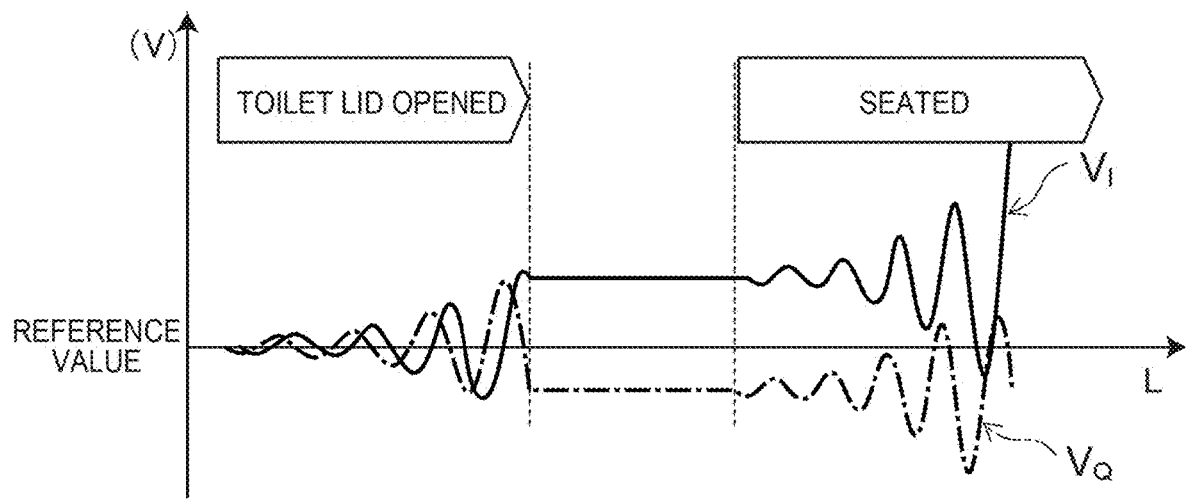
FIGS. 12A and 12B are conceptual diagrams illustrating the first signal and the second signal.
Figure 12B:
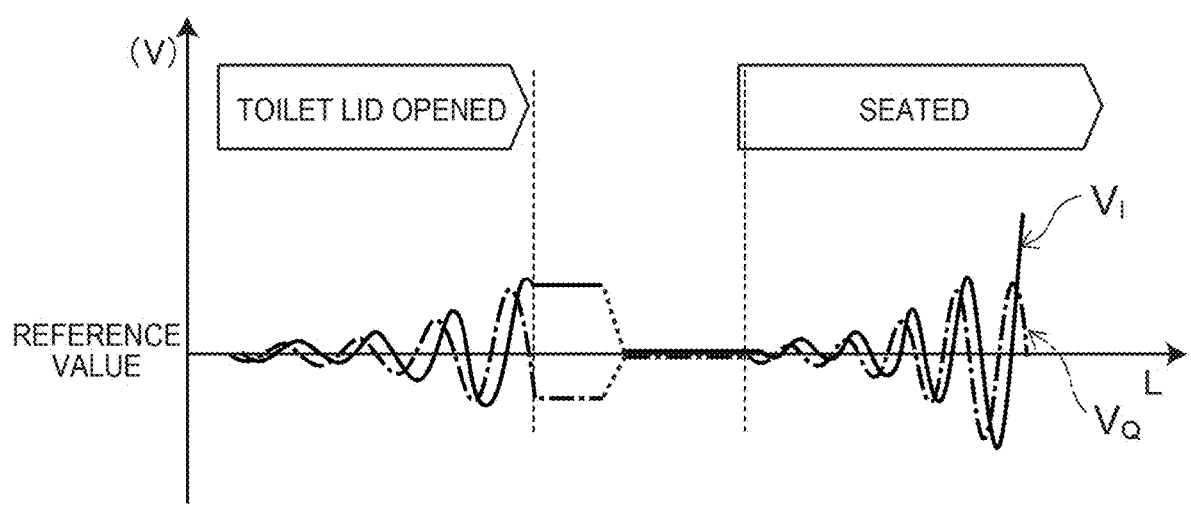

FIGS. 12A and 12B are conceptual diagrams illustrating the first signal and the second signal.

In the examples shown in FIGS. 12A and 12B, in the state of the toilet lid 300 before opening, the center of oscillation of the voltage $V_I$ and the center of oscillation of the voltage $V_Q$ are aligned by the reference value Vi_base and the reference value Vq_base. Then, the environment around the Doppler sensor 410 is changed by the opening of the toilet lid 300. This changes the signal level SL1 and the signal level SL2. In this example, after the toilet lid 300 is opened, the signal level SL1 is different from the signal level SL2. That is, the signal levels are misaligned by the opening of the toilet lid 300.

If no update is made to the reference value Vi_base used as the signal level SL1 in the difference calculation means 423a and the reference value Vq_base used as the signal level SL2 in the difference calculation means 423b, then the signal levels remain misaligned as shown in FIG. 12A. Subsequently, when the user is seated, an error occurs in the calculation of e.g. the voltage $V_E$ and the phase θ if the signal levels remain misaligned.

In contrast, in the embodiment, as shown in FIG. 12B, after the toilet lid 300 is opened, the reference value calculation means 422a updates the reference value Vi_base, and the reference value calculation means 422b updates the reference value Vq_base. Thus, when the user is seated, the signal levels have been aligned. This can suppress the error in the calculation of e.g. the voltage $V_E$ and the phase θ.

Figure 13A:
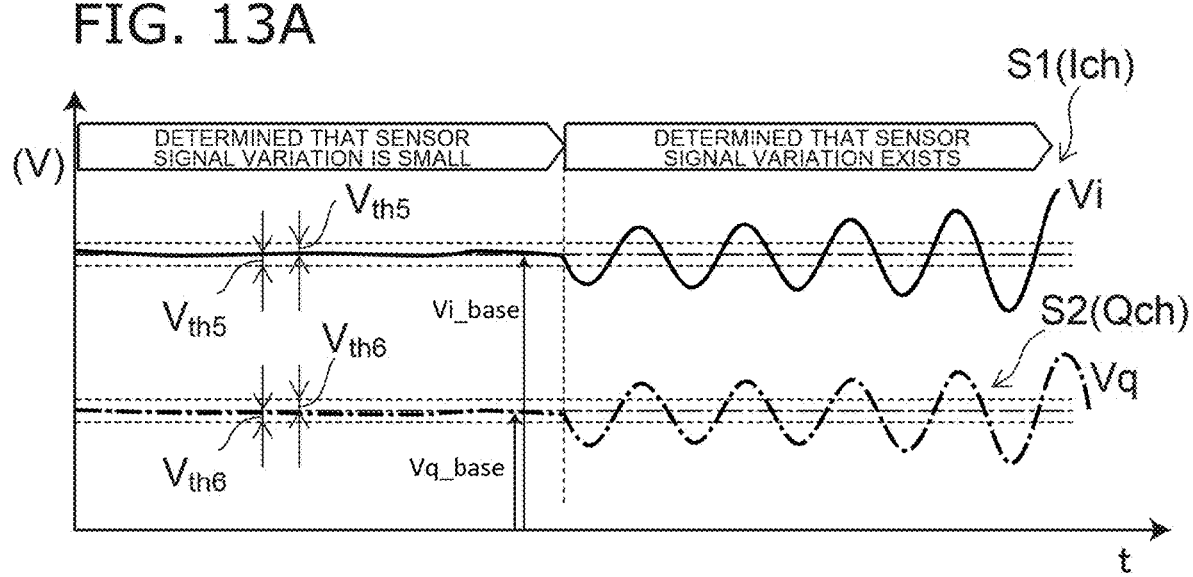
FIGS. 13A and 13B are graphs illustrating the processing of the reference value calculation means according to the embodiment.
Figure 13B:
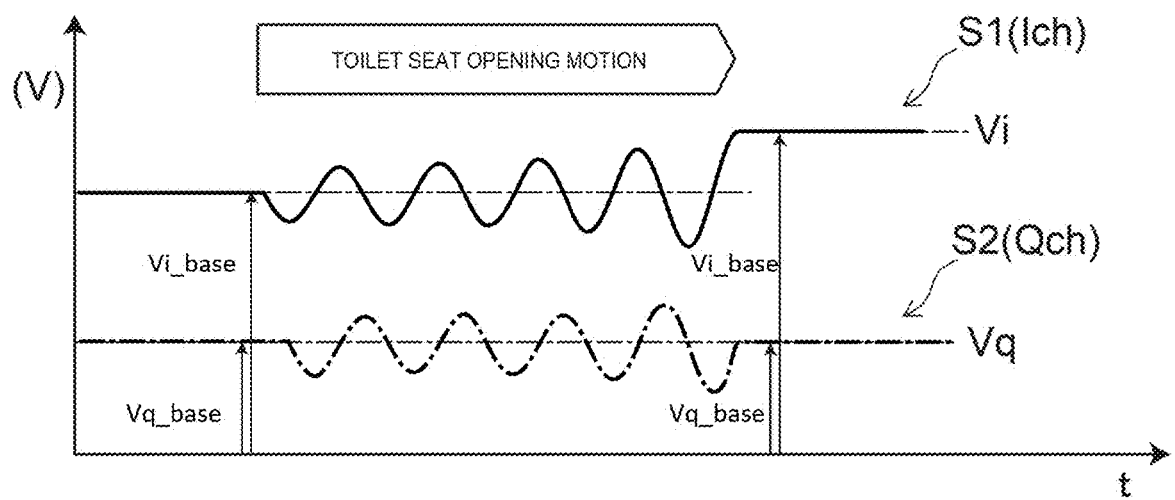

FIGS. 13A and 13B are graphs illustrating the processing of the reference value calculation means according to the embodiment.

In the example shown in FIG. 13A, the reference value calculation means 422a enables and disables changing of the reference value Vi_base based on the first signal S1. Specifically, when the change per prescribed time of the first signal S1 is less than a prescribed threshold $V_{th5}$, the reference value calculation means 422a updates the reference value Vi_base. That is, the reference value Vi_base is updated when the Doppler sensor 410 senses no user.

When the change per prescribed time of the first signal S1 is not less than the threshold $V_{th5}$, the reference value calculation means 422a does not update the reference value Vi_base. That is, the reference value Vi_base is not updated when the Doppler sensor senses room entry of a user.

Likewise, the reference value calculation means 422b enables and disables changing of the reference value Vq_base based on the second signal S2. Specifically, when the change per prescribed time of the second signal S2 is less than a prescribed threshold $V_{th6}$, the reference value calculation means 422b updates the reference value Vq_base. That is, the reference value Vq_base is updated when the Doppler sensor 410 senses no user. When the change per prescribed time of the second signal S2 is not less than the threshold $V_{th6}$, the reference value calculation means 422b does not update the reference value Vq_base. That is, the reference value Vq_base is not updated when the Doppler sensor 410 senses room entry of a user.

Thus, the reference value is updated when the Doppler sensor 410 senses no user. This can respond to the change of the environment. For instance, the error in e.g. the voltage $V_E$ and the phase difference θ can be suppressed even when the signal level changes with e.g. temperature. This can improve the accuracy of determination. On the other hand, the reference value is not changed when a user is sensed. Then, the reference value is set correctly to the signal level of the first signal S1 and the second signal S2 at the time of absence of the user. Thus, the presence or absence of the sensing target can be determined accurately.

The reference value Vi_base and the reference value Vq_base may be values predetermined for each state of the instrument. For instance, in the example shown in FIG. 13B, the reference value Vi_base and the reference value Vq_base are predetermined for each state of the toilet lid 300.

Specifically, the control section 420 has stored the reference value Vi_base in the opened state of the toilet lid 300 and the reference value Vi_base in the closed state of the toilet lid 300. In accordance with each state of the toilet lid 300, the reference value calculation means 422a outputs one of the stored reference values Vi_base.

Likewise, the control section 420 has stored the reference value Vq_base in the opened state of the toilet lid 300 and the reference value Vq_base in the closed state of the toilet lid 300. In accordance with each state of the toilet lid 300, the reference value calculation means 422b outputs one of the stored reference values Vq_base.

Thus, the reference value is set for each state of the instrument (in this example, the toilet lid 300). This can respond to the change of the state of the instrument. The error in e.g. the voltage $V_E$ and the phase difference θ can be suppressed even when the signal level changes with the state of the instrument. This can improve the accuracy of determination.

The reference value calculation means 422a may update the reference value Vi_base based on the first signal S1 after operation of the instrument. Specifically, after the toilet lid 300 is opened, the motion of the toilet lid 300 stops. Then, the reference value calculation means 422a calculates the reference value Vi_base from the first signal S1 in that state. The calculation of the reference value Vi_base can be based on e.g. the running average within a prescribed time.

Likewise, the reference value calculation means 422b may update the reference value Vq_base based on the second signal S2 after operation of the instrument. Specifically, after the toilet lid 300 is opened, the motion of the toilet lid 300 stops. Then, the reference value calculation means 422b calculates the reference value Vq_base from the second signal S2 in that state. The calculation of the reference value Vq_base can be based on e.g. the running average within a prescribed time.

Thus, the reference value in accordance with each state can be used to calculate e.g. the voltage $V_E$ and the phase difference θ. This can respond to the change of the state of the instrument and the change of the environment (the change of structure of e.g. the wall and the change of temperature for each toilet room). This can suppress the error in e.g. the voltage $V_E$ and the phase difference θ and improve the accuracy of determination.

A specific example of the operation of the sanitary device according to the embodiment is now described.

FIGS. 14A to 14E are timing charts illustrating the operation of the sanitary device according to the embodiment. In this example, the sanitary device is a toilet device including a sit-down toilet stool.

FIG. 14A shows the variation of the square ($V_E^2$) of the voltage $V_E$ associated with the motion of the sensing target (user). FIG. 14B shows the variation of the frequency f associated with the user's motion. FIG. 14C shows the variation of the integral value $S_θ$ of Δθ associated with the user's motion. FIGS. 14D and 14E show the determination result (sensing result) by the determination part 423. FIG. 14D shows the determination result of the presence or absence of entry of a user to the toilet room. FIG. 14E shows the determination result of whether or not the user is seated on the toilet seat.

At time $t_2$, a user begins to enter the toilet room. Then, $V_E^2$ increases as the user approaches the Doppler sensor 410. At this time, the frequency f increases with the movement velocity of the user. The integral value $S_θ$ increases with the distance of the user having approached the Doppler sensor 410.

The determination means 428 determines that a sensing target is present if $V_E^2$ is larger than a prescribed threshold $V_{th1}$ in the period such as time $t_2$-$t_3$ when the frequency f is higher than a prescribed threshold $f_{th1}$, and in the period such as time $t_3$-$t_4$ within a prescribed time $t_a$ from the time when the frequency f falls below the threshold $f_{th1}$. That is, the determination means 428 determines that a user has entered the room. Alternatively, the determination means 428 determines that a user has entered the room if $V_E^2$ is larger than the threshold $V_{th1}$ and the integral value $S_θ$ is larger than a prescribed threshold $S_{θth1}$.

At time $t_6$, the room entry of the user is completed. At this time, the movement velocity of the user is low. Thus, the frequency f is not more than a prescribed threshold $f_{th3}$. The approaching/leaving amount calculation means 427 does not perform the integration of Δθ when the frequency f is not more than the threshold $f_{th3}$.

For instance, it is found that the user has approached the toilet device by $V_E^2$ and the integration value $S_θ$. Then, the control section 420 transmits a control signal to the toilet lid opening/closing unit 442. Thus, at time $t_{11}$, the toilet lid 300 begins to open. Subsequently, at time $t_{12}$, the toilet lid 300 finishes opening, and the operation of the toilet lid 300 stops. As described before, when the operation of the toilet lid 300 stops, the reference value calculation means 422a and 422b update the reference values Vi_base and Vq_base.

When the operation of the toilet lid 300 stops, the integration value $S_θ$ is reset. For instance, at time $t_{12}$, the approaching/leaving amount calculation means 427 sets the integration value $S_θ$ to zero. That is, the integration value $S_θ$ is calculated by equation (9).

$$S_θ = \sum_{k=m}^{n} \Delta θ \qquad \text{[Math 1]}$$

m: Operation end time of the instrumnent m ~ n: f > $f_{th3}$

Here, k=m . . . n represents the integration range of time. As described before, when the operation of the toilet lid 300 stops, the integration value $S_θ$ is reset. Thus, m corresponds to the time when the operation of the instrument (toilet lid 300) is completed. That is, the integration value $S_θ$ is an integration value of Δθ after the operation of the instrument. Thus, the change of the integration value $S_θ$ due to the operation of the instrument can be neglected by resetting the integration value $S_θ$ after the operation of the instrument. Accordingly, the motion of the sensing target (user) can be recognized accurately.

The integration value $S_θ$ is an integration value of Δθ in the period in which the frequency f is higher than the threshold $f_{th3}$. For instance, when the frequency f is higher than the threshold $f_{th3}$, it can be definitely determined that the sensing target has moved. Performing integration only in such cases can suppress the change of the integration value $S_θ$ due to the causes other than definite motions of the sensing target. Thus, the motion of the sensing target can be recognized accurately.

At time $t_{21}$, the user begins to be seated on the toilet seat 200. Then, $V_E^2$ increases as the user approaches the Doppler sensor 410. At this time, the frequency f increases with the movement velocity of the user. The integration value $S_θ$ increases with the distance of the user having approached the Doppler sensor 410.

The determination means 428 determines that the user has been seated if $V_E^2$ is larger than a prescribed threshold $V_{th2}$ in the period such as time $t_{23}$-$t_{24}$ when the frequency f is higher than a prescribed threshold $f_{th2}$, and in the period such as time $t_{24}$-$t_{25}$ within a prescribed time $t_b$ from the time when the frequency f falls below the threshold $f_{th2}$. Alternatively, the determination means 428 determines that the user has been seated if $V_E^2$ is larger than the threshold $V_{th2}$ and the integral value $S_θ$ is larger than a prescribed threshold $S_{θth2}$.

The integration of Δθ is not performed if the frequency f is not more than the threshold $f_{th3}$ while it is determined that the user stays seated, such as time $t_{31}$ to time $t_{46}$.

At time $t_{41}$, the user begins to stand up from the toilet seat 200. Then, $V_E^2$ decreases as the user leaves the Doppler sensor 410. At this time, the frequency f increases with the movement velocity of the user. The integration value $S_\theta$ decreases with the distance of the user having left the Doppler sensor 410.

The determination means 428 determines that the user has been unseated if $V_E^2$ is smaller than a prescribed threshold $V_{th3}$ in the period such as time $t_{43}$-$t_{44}$ when the frequency f is higher than the prescribed threshold $f_{th2}$, and in the period such as time $t_{44}$-$t_{45}$ within the prescribed time $t_b$ from the time when the frequency f falls below the threshold $f_{th2}$. Alternatively, the determination means 428 determines that the user has been unseated if $V_E^2$ is smaller than the threshold $V_{th3}$ and the integral value $S_\theta$ is smaller than the threshold $S_{\theta th2}$.

Subsequently, at time $t_{51}$, the user begins to exit from the room. Then, $V_E^2$ decreases as the user leaves the Doppler sensor 410. At this time, the frequency f increases with the movement velocity of the user. The integration value $S_\theta$ decreases with the distance of the user having left the Doppler sensor 410.

The determination means 428 determines that the user has exited from the room if $V_E^2$ is smaller than the prescribed threshold $V_{th1}$ in the period within a prescribed time $t_c$ from the time such as time $t_{53}$ when the frequency f is higher than the prescribed threshold $f_{th1}$. Alternatively, the determination means 428 determines that the user has exited from the room if $V_E^2$ is smaller than the threshold $V_{th1}$ and the integral value $S_\theta$ is smaller than the threshold $-S_{\theta th1}$.

For instance, upon determining that the user has exited from the room, the control section 420 transmits a control signal to the toilet lid opening/closing unit 442. Thus, at time $t_{61}$, the toilet lid 300 begins to close. Subsequently, at time $t_{62}$, the toilet lid 300 finishes closing, and the operation of the toilet lid 300 stops. Then, the reference value calculation means 422a and 422b update the reference values Vi_base and Vq_base, and the integration value $S_\theta$ is reset.

As described above, the determination means 428 can use not only the voltage $V_E$ but also the frequency f and the integration value $S_\theta$ (phase θ) for room entry determination, room exit determination, seating determination, and unseating determination. Depending on the user's posture with respect to the Doppler sensor 410, the voltage $V_E$ may be low with a low probability even when the user is entering the room or stays seated. Thus, the determination is based on not only the voltage $V_E$ but also the frequency f and the integration value $S_\theta$. Accordingly, the determination can be made within a limited time such as after the motion of the sensing target. Furthermore, the determination can be based on the movement distance of the sensing target (approaching amount and leaving amount). This can prevent erroneous sensing.

FIGS. 15A to 15D are timing charts illustrating the operation of the sanitary device according to the embodiment. This example illustrates the case where a user performs urination on the toilet device including a sit-down toilet stool.

FIG. 15A shows the variation of the square ($V_E^2$) of the voltage $V_E$ associated with the motion of the sensing target (user). FIG. 15B shows the variation of the frequency f associated with the user's motion. FIG. 15C shows the variation of the integral value $S_\theta$ of Δθ associated with the user's motion. FIG. 15D shows the determination result of the presence or absence of entry of a user to the toilet room.

At time $t_{102}$, a user begins to enter the toilet room. Then, $V_E^2$ increases as the user approaches the Doppler sensor 410. At this time, the frequency f increases with the movement velocity of the user. The integral value $S_\theta$ increases with the distance of the user having approached the Doppler sensor 410.

The determination means 428 determines that a user has entered the room if $V_E^2$ is larger than a prescribed threshold $V_{th1}$ in the period such as time $t_{102}$-$t_{103}$ when the frequency f is higher than a prescribed threshold $f_{th1}$, and in the period such as time $t_{103}$-$t_{104}$ within a prescribed time $t_a$ from the time when the frequency f falls below the threshold $f_{th1}$. Alternatively, the determination means 428 determines that a user has entered the room if $V_E^2$ is larger than the threshold $V_{th1}$ and the integral value $S_\theta$ is larger than a prescribed threshold $S_{\theta th1}$.

At time $t_{106}$, the room entry of the user is completed. At this time, the movement velocity of the user is low. Thus, the frequency f is not more than a prescribed threshold $f_{th3}$. The approaching/leaving amount calculation means 427 does not perform the integration of Δθ when the frequency f is not more than the threshold $f_{th3}$.

For instance, it is found that the user has approached the toilet device by $V_E^2$ and the integration value $S_\theta$. Then, the control section 420 transmits a control signal to the toilet lid opening/closing unit 442. Thus, at time $t_{111}$, the toilet lid 300 begins to open.

Subsequently, at time $t_{112}$, the toilet lid 300 finishes opening, and the operation of the toilet lid 300 stops. As described before, when the operation of the toilet lid 300 stops, the reference value calculation means 422a and 422b update the reference values Vi_base and Vq_base. When the operation of the toilet lid 300 stops, the integration value $S_\theta$ is reset.

At time $t_{121}$, the user manipulates the manipulation section 500. Thus, a control signal is transmitted from the control section 420 to the toilet seat opening/closing unit 441, and the toilet seat 200 begins to open. At time $t_{122}$, the toilet seat 200 finishes opening, and the motion of the toilet seat 200 stops. When the operation of the toilet seat 200 stops, the reference value calculation means 422a and 422b update again the reference values Vi_base and Vq_base. When the operation of the toilet seat 200 stops, the integration value $S_\theta$ is reset.

Subsequently, the user does his business in the standing state. At this time, the user's body does not substantially move with respect to the Doppler sensor 410. Thus, the frequency f is not more than the threshold $f_{th3}$. Also while the user is doing his business, Δθ is not integrated if the frequency f is not more than the threshold $f_{th3}$.

Subsequently, the user begins to exit from the room. Then, $V_E^2$ decreases as the user leaves the Doppler sensor 410. At this time, the frequency f increases with the movement velocity of the user. The integration value $S_\theta$ decreases with the distance of the user having left the Doppler sensor 410.

The determination means 428 determines that the user has exited from the room if $V_E^2$ is smaller than the prescribed threshold $V_{th1}$ in the period within a prescribed time $t_c$ from the time such as time $t_{132}$ when the frequency f is higher than the prescribed threshold $f_{th1}$. Alternatively, the determination means 428 determines that the user has exited from the room if $V_E^2$ is smaller than the threshold $V_{th1}$ and the integral value $S_\theta$ is smaller than the threshold $-S_{\theta th1}$.

For instance, upon determining that the user has exited from the room, the control section 420 transmits a control signal to the toilet seat opening/closing unit 441 and the toilet lid opening/closing unit 442. Thus, the toilet seat 200 and the toilet lid 300 begin to close. Subsequently, the toilet seat 200 and the toilet lid 300 finish closing and stop operation. Then, the reference value calculation means 422a and 422b update the reference values Vi_base and Vq_base, and the integration value $S_\theta$ is reset.

FIGS. 16A to 16D are timing charts illustrating the operation of the sanitary device according to the embodiment. In this example, the sanitary device is a toilet device including a urinal.

Figure 16A:
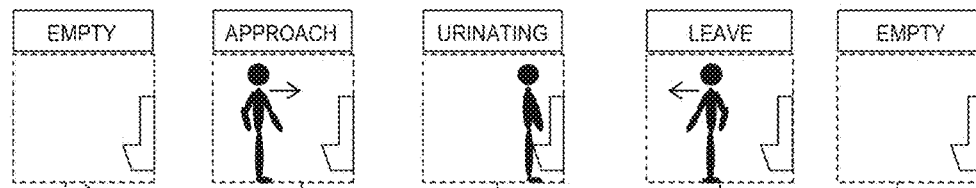
FIGS. 16A to 16D are timing charts illustrating the operation of the sanitary device according to the embodiment.
Figure 16B:
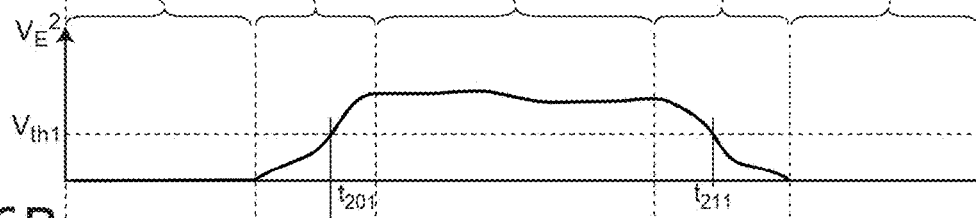
Figure 16C:
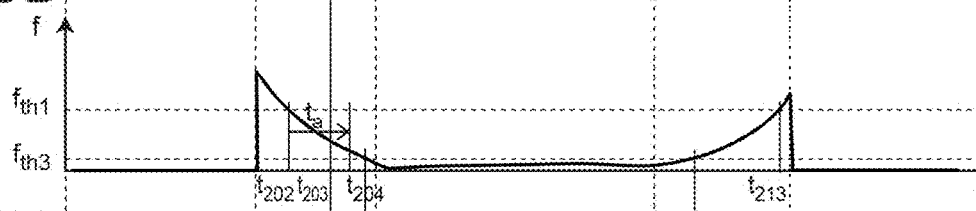
Figure 16D:
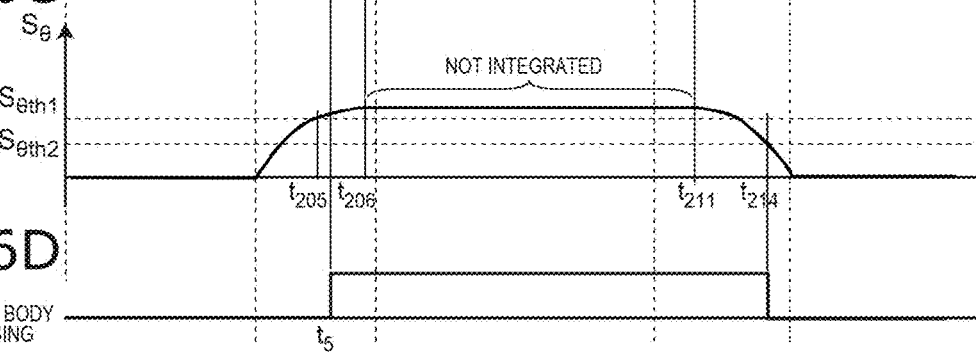

FIG. 16A shows the variation of the square ($V_E^2$) of the voltage $V_E$ associated with the motion of the sensing target (user). FIG. 16B shows the variation of the frequency f associated with the user's motion. FIG. 16C shows the variation of the integral value $S_\theta$ of $\Delta\theta$ associated with the user's motion. FIG. 16D shows the result of human body sensing (the determination result of the presence or absence of the sensing target). That is, in this example, it is determined by the Doppler sensor 410 whether or not the user approaches the urinal.

At time $t_{202}$, a user approaches the urinal. Then, $V_E^2$ increases as the user approaches the Doppler sensor 410. At this time, the frequency f increases with the movement velocity of the user. The integral value $S_\theta$ increases with the distance of the user having approached the Doppler sensor 410.

The determination means 428 determines that a user has approached the urinal if $V_E^2$ is larger than a prescribed threshold $V_{th1}$ in the period such as time $t_{202}$-$t_{203}$ when the frequency f is higher than a prescribed threshold $f_{th1}$, and in the period such as time $t_{203}$-$t_{204}$ within a prescribed time $t_a$ from the time when the frequency f falls below the threshold $f_{th1}$. Alternatively, the determination means 428 determines that a user has approached the urinal if $V_E^2$ is larger than the threshold $V_{th1}$ and the integral value $S_\theta$ is larger than a prescribed threshold $S_{\theta th1}$.

At time $t_{206}$, the room entry of the user is completed. At this time, the movement velocity of the user is low. Thus, the frequency f is not more than a prescribed threshold $f_{th3}$.

Subsequently, the user does his business. At this time, the user's body does not substantially move with respect to the Doppler sensor 410. Thus, the frequency f is not more than the threshold $f_{th3}$ even if the user moves e.g. the arm. The approaching/leaving amount calculation means 427 does not perform the integration of $\Delta\theta$ when the frequency f is not more than the threshold $f_{th3}$.

Subsequently, the user begins to leave the urinal. $V_E^2$ decreases as the user leaves the Doppler sensor 410. At this time, the frequency f increases with the movement velocity of the user. The integration value $S_\theta$ decreases with the distance of the user having left the Doppler sensor 410.

The determination means 428 determines that the user has left the urinal if $V_E^2$ is smaller than the prescribed threshold $V_{th1}$ in the period within a prescribed time $t_c$ from the time such as time $t_{213}$ when the frequency f is higher than the prescribed threshold $f_{th1}$. Alternatively, the determination means 428 determines that the user has left the urinal if $V_E^2$ is smaller than the threshold $V_{th1}$ and the integral value $S_\theta$ is smaller than the threshold $S_{\theta th2}$.

The embodiments of the invention have been described above. However, the invention is not limited to the above description. Those skilled in the art can appropriately modify the design of the above embodiments. Such modifications are also encompassed within the scope of the invention as long as they include the features of the invention. For instance, the shape, dimension, material, layout and the like of each element such as the Doppler sensor 410, the control section 420 and the controlled section 401, and the installation configuration and the like of the Doppler sensor 410 are not limited to those illustrated, but can be suitably modified.

Furthermore, the elements of the above embodiments can be combined with each other as long as technically feasible. Such combinations are also encompassed within the scope of the invention as long as they include the features of the invention.

What is claimed is:

1. A sanitary device comprising:
a radio wave sensor configured to obtain information on a sensing target by a reflection wave of an emitted radio wave; and
a control section configured to control an operation of an instrument based on a sensing signal including a first signal and a second signal outputted from the radio wave sensor,
a difference between a phase of the second signal and a phase of the first signal being not less than 60° and not more than 120°, and
the control section being configured to determine presence or absence of the sensing target based on a sum of a squared value of a difference between a value of the first signal and a first reference value and a squared value of a difference between a value of the second signal and a second reference value,
the control section changing the first reference value when a change of the first signal for a prescribed time is less than a first prescribed threshold, and
the control section changing the second reference value when a change of the second signal for a prescribed time is less than a second prescribed threshold.

2. A sanitary device comprising:
a radio wave sensor configured to obtain information on a sensing target by a reflection wave of an emitted radio wave; and
a control section configured to control an operation of an instrument based on a sensing signal including a first signal and a second signal outputted from the radio wave sensor,
a difference between a phase of the second signal and a phase of the first signal being not less than 60° and not more than 120°,
the control section being configured to determine a presence or absence of the sensing target based on a sum of a squared value of a difference between a value of the first signal and a first reference value and a squared value of a difference between a value of the second signal and a second reference value,
the control section changing the first reference value based on the first signal after an operation of the instrument, and
the control section changing the second reference value based on the second signal after the operation of the instrument.

3. The device according to claim 1, wherein the control section calculates a frequency of the sensing signal and determines a presence or absence of the sensing target when the frequency is higher than a prescribed threshold and within a prescribed time from a time when the frequency falls below the prescribed threshold.

4. The device according to claim 1, wherein the control section calculates a movement amount indicating a distance of the sensing target having approached the radio wave sensor or a distance of the sensing target having left the radio wave sensor based on the first signal and the second signal, and uses the movement amount to determine presence or absence of the sensing target.

5. The device according to claim 2, wherein the control section calculates a frequency of the sensing signal and determines a presence or absence of the sensing target when the frequency is higher than a prescribed threshold and within a prescribed time from the time when the frequency falls below the prescribed threshold.

6. The device according to claim 2, wherein the control section calculates a movement amount indicating a distance of the sensing target having approached the radio wave sensor or a distance of the sensing target having left the radio wave sensor based on the first signal and the second signal, and uses the movement amount to determine a presence or absence of the sensing target.

* * * * *